United States Patent
Oyama et al.

(10) Patent No.: US 10,806,999 B2
(45) Date of Patent: Oct. 20, 2020

(54) SERVER, SYSTEM, METHOD, AND INFORMATION PROCESSOR FOR IDENTIFYING A PLURALITY OF SCREENS TO IMPROVE USER INTERFACE

(71) Applicant: Universal Entertainment Corporation, Tokyo (JP)

(72) Inventors: Masaki Oyama, Tokyo (JP); Atsushi Kumita, Tokyo (JP); Toshikazu Jinnouchi, Tokyo (JP)

(73) Assignee: UNIVERSAL ENTERTAINMENT CORPORATION, Tokyo (JP)

( * ) Notice: Subject to any disclaimer, the term of this patent is extended or adjusted under 35 U.S.C. 154(b) by 24 days.

(21) Appl. No.: 16/057,916

(22) Filed: Aug. 8, 2018

(65) Prior Publication Data

US 2019/0099672 A1  Apr. 4, 2019

(30) Foreign Application Priority Data

Sep. 29, 2017  (JP) ................ 2017-189809

(51) Int. Cl.
| | |
|---|---|
| *A63F 13/493* | (2014.01) |
| *G06F 9/451* | (2018.01) |
| *G07F 17/32* | (2006.01) |
| *A63F 13/52* | (2014.01) |
| *A63F 13/35* | (2014.01) |
| *A63F 13/80* | (2014.01) |

(52) U.S. Cl.
CPC ............ *A63F 13/493* (2014.09); *A63F 13/35* (2014.09); *A63F 13/52* (2014.09); *A63F 13/80* (2014.09); *G06F 9/451* (2018.02); *G07F 17/3213* (2013.01); *G07F 17/3258* (2013.01); *G07F 17/3267* (2013.01); *G07F 17/3269* (2013.01); *G07F 17/3288* (2013.01); *G07F 17/3246* (2013.01); *G07F 17/3248* (2013.01); *G07F 17/3255* (2013.01)

(58) Field of Classification Search
None
See application file for complete search history.

(56) References Cited

U.S. PATENT DOCUMENTS

| | | | | |
|---|---|---|---|---|
| 2006/0148571 | A1* | 7/2006 | Hossack | A63F 13/10 463/43 |
| 2008/0090636 | A1* | 4/2008 | Lathrop | G07F 17/34 463/20 |
| 2010/0087251 | A1* | 4/2010 | Collar | A63F 13/10 463/31 |
| 2010/0190555 | A1* | 7/2010 | Dutilly | A63F 13/493 463/43 |

(Continued)

*Primary Examiner* — Jason T Yen
(74) *Attorney, Agent, or Firm* — Lex IP Meister, PLLC

(57) ABSTRACT

The present invention is able to improve the user interface in a game. The server (10) stores identification information for respectively identifying a plurality of kinds of screens which can be transitioned by the information processor 1, stores the identification information of the transition destination screen in the memory (3) when a screen transition is performed in the information processor (1), and displays a screen identified by the identification information stored in the memory (3) as an initial screen of the game of the information processor (1) when starting a game according to a request from the information processor 1.

6 Claims, 14 Drawing Sheets

(56) References Cited

U.S. PATENT DOCUMENTS

| | | | | |
|---|---|---|---|---|
| 2014/0113705 A1* | 4/2014 | Fear | ............. | A63F 13/35 |
| | | | | 463/24 |
| 2015/0367238 A1* | 12/2015 | Perrin | ............. | A63F 13/30 |
| | | | | 463/29 |
| 2017/0266564 A1* | 9/2017 | Choudhuri | ............. | A63F 13/795 |
| 2017/0371678 A1* | 12/2017 | Wang | ............. | A63F 13/35 |
| 2018/0001198 A1* | 1/2018 | Frappiea | ............. | A63F 13/213 |

* cited by examiner

FIG.5
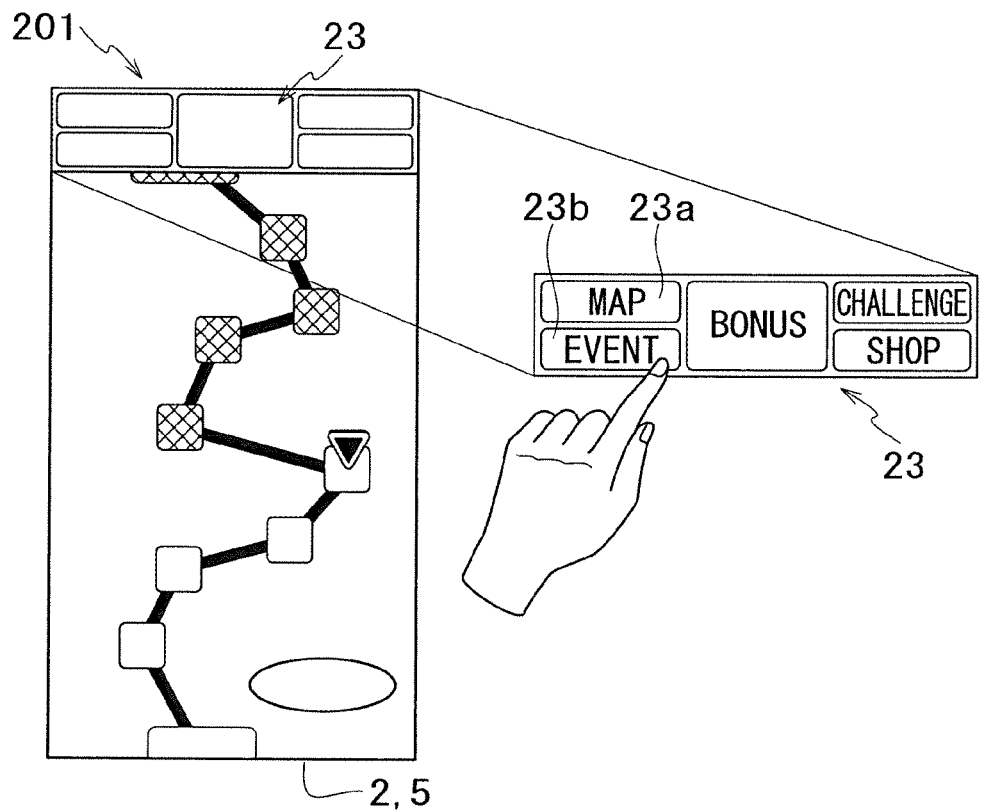
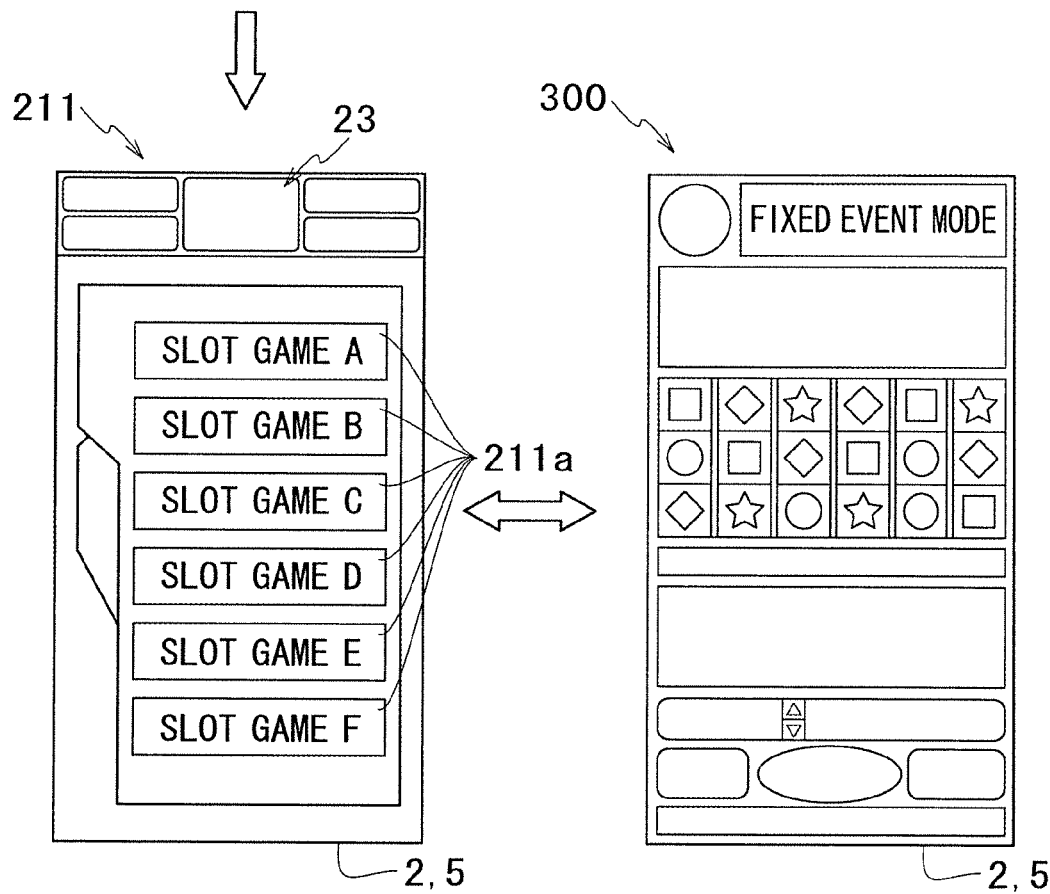

FIG.9

SCREEN IDENTIFICATION INFORMATION TABLE

| MODE | MODE ID | SCREEN | SCREEN ID | INITIAL SCREEN OBJECT | DEFAULT SCREEN |
|---|---|---|---|---|---|
| MAP | 0001 | MAP SCREEN | 00010001 | TRUE | TRUE |
| MAP | 0001 | STAGE SELECTION SCREEN | 00010002 | FALSE | FALSE |
| MAP | 0001 | SLOT GAME A | 00010003 | TRUE | FALSE |
| MAP | 0001 | SLOT GAME B | 00010004 | TRUE | FALSE |
| ... | ... | ... | ... | ... | ... |
| FIXED EVENT | 0004 | FIXED EVENT MENU | 00040001 | TRUE | TRUE |
| FIXED EVENT | 0004 | SLOT GAME A | 00040002 | TRUE | FALSE |
| FIXED EVENT | 0004 | SLOT GAME B | 00040003 | TRUE | FALSE |
| ... | ... | ... | ... | ... | ... |
| TIME-DEFINED EVENT | 0007 | TIME-DEFINED EVENT MENU | 00070001 | TRUE | TRUE |
| TIME-DEFINED EVENT | 0007 | SLOT GAME A | 00070002 | TRUE | FALSE |
| TIME-DEFINED EVENT | 0007 | SLOT GAME B | 00070003 | TRUE | FALSE |
| ... | ... | ... | ... | ... | ... |
| SHOP | 0012 | PURCHASE OBJECT SELECTION MENU | 00120001 | FALSE | FALSE |
| SHOP | 0012 | IN-GAME CURRENCY PURCHASE SCREEN | 00120002 | FALSE | FALSE |
| SHOP | 0012 | COIN PURCHASE SCREEN | 00120003 | FALSE | FALSE |
| SHOP | 0012 | ITEM PURCHASE SCREEN | 00120004 | FALSE | FALSE |
| ... | ... | ... | ... | ... | ... |

FIG.10

TRANSITION HISTORY DATA TABLE

| USER ID | SCREEN ID | GAME STATE | REMAINING NUMBER OF GAME PLAY | BET | ITEM | REMAINING TIMES | SLOT STATE | RANDOM NUMBER | EFFECT RANDOM NUMBER |
|---|---|---|---|---|---|---|---|---|---|
| 00265784 | 00010003 | BONUS GAME | 10 | 12 | PAYOUT UP | 21 | BEFORE SPINNING | — | — |
| 00000247 | 00040003 | NORMAL GAME | — | 1 | — | — | DURING SPINNING | 5269513 | 6153375 |
| 01527457 | 00070002 | NORMAL GAME | — | 9 | — | — | BEFORE SPINNING | — | — |
| 00025674 | 00010003 | NORMAL GAME | — | 16 | AUTO IN A HIGH SPEED | 3 | BEFORE SPINNING | — | — |
| 00021357 | 00040002 | BONUS GAME | 8 | 6 | — | — | AFTER SPINNING | 74267623 | 3824547 |
| 00419843 | 00040003 | BONUS GAME | 2 | 2 | — | — | DURING SPINNING | 87656941 | 5850471 |
| 03214578 | 00070003 | NORMAL GAME | — | 14 | BONUS RATE UP | 12 | AFTER SPINNING | 32551299 | 8432098 |
| 00002301 | 00120004 | — | — | — | — | — | — | — | — |
| ... | ... | ... | ... | ... | ... | ... | ... | ... | ... |

SERVER, SYSTEM, METHOD, AND INFORMATION PROCESSOR FOR IDENTIFYING A PLURALITY OF SCREENS TO IMPROVE USER INTERFACE

CROSS-REFERENCE TO RELATED APPLICATION

This application claims the benefit of Japanese Pat. App. No. 2017-189809, filed on Sep. 29, 2017, which application is incorporated herein by reference in its entirety.

BACKGROUND OF THE INVENTION

1. Field of Invention

The present invention relates to a server, a game system, a non-transitory computer-readable medium, a game control method, and an information processor.

2. Description of Related Art

In the related art, there are various types of games to be performed by a home type game console device, a game device installed in a facility, or an information processor such as a smart phone. For example, there is a slot game in which a slot game is played by betting various gaming mediums (currency in a game or the like) and a slot game in which a benefit (payout) is given based on a the gaming mediums and a combination of symbols (game result) displayed on a screen (referring to the specification of the U.S. Pat. No. 8,636,593).

Such a game is very important to the game provider in terms of how it can be continuously and repeatedly performed by the user, because it is based on having fun by repeating one game (unit game) from game start to acquiring a game result.

In addition, in recent years, games provided by portable terminals such as a tablet, a smart phone and the like have become increasingly popular. This kind of game is mostly provided in a basic play free manner, and can be easily installed in a portable terminal by downloading and easily introduced, so the user can play a large number of games. However, in general, a game in which a user continues to play for a long time is only a limited part thereof, and therefore it is difficult to cause a user to select a game which is provided as an object which is played continuously.

This game generally includes a game element such as a slot game, and has a common interface in terms of playing this basic part in a screen transitioning from a menu, a map and the like to the game element. Therefore, an aspect of making this basic interface easy to use for a user and allowing a user to continuously play for a long time is a technical problem to be solved.

BRIEF SUMMARY OF THE INVENTION

Accordingly, an object of the present invention is to provide a server, a game system, a non-transitory computer-readable medium, a game control method, and an information processor capable of improving a user interface in a game.

The present invention is a server for causing a plurality of information processor to run a game, comprising:
a communication unit capable of performing data communication with the information processor;
a memory for storing identification information for respectively identifying a plurality of kinds of screens that can be transitioned by the information processor in the game; and
a controller,
the controller being programmed to execute:
a process of storing the identification information of the screen of the transition destination in the memory when a screen transition is performed in the information processor; and
a process of displaying a screen identified by the identification information stored in the memory as an initial screen of the game in the information processor when the game is started in response to a request from the information processor.

According to the configuration mentioned above, in a game where the screen is transitioned among a plurality of kinds of screens, the identification information for identifying the transitioned screen is stored in the server when the screen is transitioned, and the screen indicated by the identification information stored in the server is used as the initial screen when starting. Thus, the server always stores the identification information of the screen displayed at last in the game, and the screen displayed at the end of the game is displayed when the game is started for the next time no matter at which screen the user ends the game. As a result, it is not necessary for the user to memorize the screen at the time of the last termination, and there is no need to transition from the screen after the activation to the screen at the time of the last termination, so that the user interface in the game can be improved.

In the server of the present invention, it is also possible that:
the plurality of kinds of screens include an event screen for executing an event, and
the controller is programmed to execute:
a process of acquiring temporarily stored data at a time of execution of the event in the event screen and sequentially storing the data into the memory;
a process of acquiring the identification information and the temporarily stored data at a start of the game;
a process of determining whether or not the event is being executed at the termination of a previous game based on the temporarily stored data; and
a process of causing the information processor to resume the event based on the temporarily stored data when it is determined that the event is being executed in the process of determining.

According to the configuration mentioned above, in the game where the screen is transitioned among a plurality of kinds of screens, the temporarily stored data during the execution of the event in the event screen is also stored in the server. Thus, when the previous end screen is the event screen at the time of resuming the game, not only the event screen is displayed as the initial screen but also the event is resumed based on the temporarily stored data in a case that the event is being executed when a previous event ends. As a result, a user can be helped when the user has to stop the event despite satisfying the event execution condition, and thus the user interface of the game can be improved.

In the server of the present invention, it is also possible that:
the event is a slot game in which symbols for slot are variably displayed and stop-displayed in a symbol display area displayed in the information processor,
the controller stores a game state of the slot game and a unit game information in one game as the temporarily stored data.

According to the configuration mentioned above, the event is a slot game in which symbols for slot are variably displayed and stop-displayed, a game state of the slot game and a unit game information in one game is stored as the temporarily stored data in the server, and the slot game is started again based on the information when the game is started again. Thus, even when the user ends the game halfway through the unit game of the slot game, the unit game can be resumed halfway again. As a result, the user can be helped even when the user has to stop the slot game even though the slot game has already started, and thereby it is able to improve the user interface of the game.

The present invention is a game system having a plurality of information processor and a server for causing the plurality of information processor to run a game, wherein the server includes:
a communication unit capable of performing data communication with the information processor;
a memory for storing identification information for respectively identifying a plurality of kinds of screens that can be transitioned by the information processor in the game; and
a controller, and
the controller is programmed to execute:
a process of storing the identification information of the screen of the transition destination in the memory when a screen transition is performed in the information processor; and
a process of displaying a screen identified by the identification information stored in the memory as an initial screen of the game in the information processor when the game is started.

According to the configuration mentioned above, in a game where the screen is transitioned among a plurality of kinds of screens, the identification information for identifying the transitioned screen is stored in the server when the screen is transitioned, and the screen indicated by the identification information stored in the server is used as the initial screen when starting. Thus, the server always stores the identification information of the screen displayed at last in the game, and the screen displayed at the end of the game is displayed when the game is started for the next time no matter at which screen the user ends the game. As a result, it is not necessary for the user to memorize the screen at the time of the last termination, and there is no need to transition from the screen after the activation to the screen at the time of the last termination, so that the user interface in the game can be improved.

The present invention is a non-transitory computer-readable medium storing a game program of a server for causing a plurality of information processor to run a game;
The game program causing a computer having a communication unit capable of performing data communication with the information processor and a memory for storing identification information for respectively identifying a plurality of kinds of screens that can be transitioned by the information processor in the game to execute:
a process of storing the identification information of the screen of the transition destination in the memory when a screen transition is performed in the information processor; and
a process of displaying a screen identified by the identification information stored in the memory as an initial screen of the game in the information processor when the game is started in response to a request from the information processor.

According to the configuration mentioned above, in a game where the screen is transitioned among a plurality of kinds of screens, the identification information for identifying the transitioned screen is stored in the server when the screen is transitioned, and the screen indicated by the identification information stored in the server is used as the initial screen when starting. Thus, the server always stores the identification information of the screen displayed at last in the game, and the screen displayed at the end of the game is displayed when the game is started for the next time no matter at which screen the user ends the game. As a result, it is not necessary for the user to memorize the screen at the time of the last termination, and there is no need to transition from the screen after the activation to the screen at the time of the last termination, so that the user interface in the game can be improved.

The present invention is a game control method executed by a computer, and the computer comprises: a server for causing a plurality of information processor to run a game; a communication unit capable of performing data communication with the information processor; and a computer having a memory for storing identification information for respectively identifying a plurality of kinds of screens that can be transitioned by the information processor in the game, the game control method comprising the step of:
storing the identification information of the screen of the transition destination in the memory when a screen transition is performed in the information processor; and
displaying a screen identified by the identification information stored in the memory as an initial screen of the game in the information processor when the game is started in response to a request from the information processor.

According to the configuration mentioned above, in a game where the screen is transitioned among a plurality of kinds of screens, the identification information for identifying the transitioned screen is stored in the server when the screen is transitioned, and the screen indicated by the identification information stored in the server is used as the initial screen when starting. Thus, the server always stores the identification information of the screen displayed at last in the game, and the screen displayed at the end of the game is displayed when the game is started for the next time no matter at which screen the user ends the game. As a result, it is not necessary for the user to memorize the screen at the time of the last termination, and there is no need to transition from the screen after the activation to the screen at the time of the last termination, so that the user interface in the game can be improved.

An information processor comprising a memory for storing identification information for respectively identifying a plurality of kinds of screens that can be transitioned in the game; and
a controller,
the controller executing:
a process of storing the identification information of the screen of the transition destination in the memory when the screen is transitioned; and
a process of displaying a screen identified by the identification information stored in the memory as an initial screen of the game when the game is started.

According to the configuration mentioned above, in a game where the screen is transitioned among a plurality of kinds of screens, the identification information for identifying the transitioned screen is stored when the screen is transitioned, and the screen indicated by the identification information stored is used as the initial screen when starting. Thus, the information processor always stores the identification information of the screen displayed at last in the game, and the screen displayed at the end of the game is displayed when the game is started for the next time no matter at which screen the user ends the game. As a result, it is not necessary for the user to memorize the screen at the time of the last termination, and there is no need to transition from the screen after the activation to the screen at the time of the last termination, so that the user interface in the game can be improved.

The present invention is able to improve the user interface in a game.

BRIEF DESCRIPTION OF THE DRAWINGS

FIG. 5 is a diagram showing an example of a screen transition of the information processor.

FIG. 9 is an illustrative view of a screen identification information table.

FIG. 10 is an illustrative view of a transition history data table.

DETAILED DESCRIPTION OF THE PREFERRED EMBODIMENT

The information processor of the present invention will be described based on the drawings.

Summary

Figure 1:
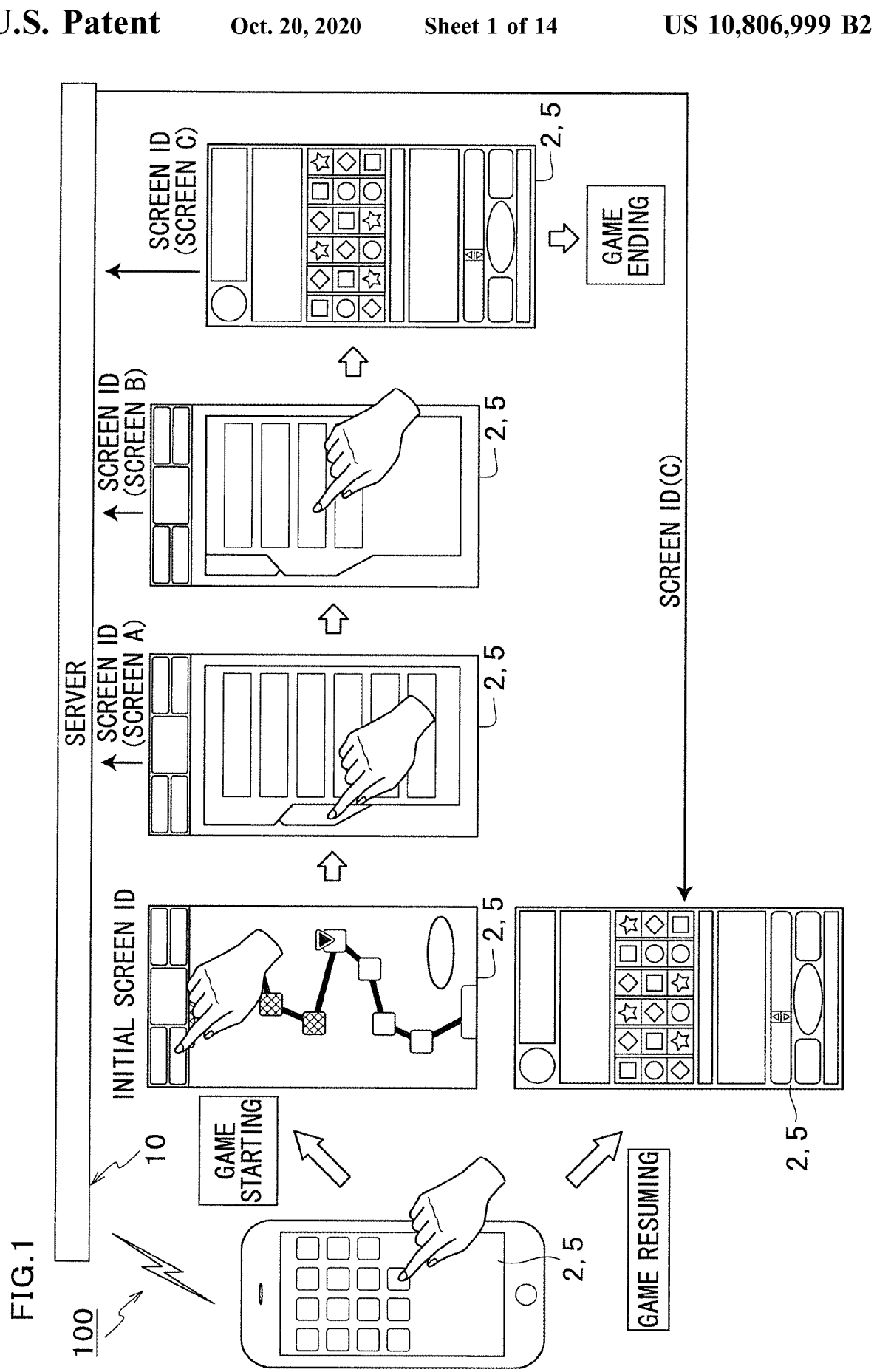
FIG. 1 is an illustrative view showing an operation state of the present invention.

As shown in FIG. 1, the server 10 can set the first screen displayed after the game is started as the screen of a mode which is recently displayed.

The information processor 1 is connected to the server 10 via a communication line so as to be capable of performing data communication and constitutes a game system 100 having a plurality of information processor 1 and the server 10. In addition, the game system 100 is not limited thereto, and it may be configured only by the information processor 1 or may be configured only by the server 10.

In the following description, it may be premised that the user logins to the server 10 via the information processor 1. For example, the user logins through the authentication by the server 10 by inputting a user ID and a password in the information processor 1 via the communication line. In addition, the information processor 1 may also store the login information for the login authentication, and the user automatically logs in to the server 10 using the login information stored without input by the user when the user starts the game. In addition, the information processor 1 may also automatically log in to the server 10 with the stored login information by performing Biometrics authentication of the user when the user starts the game. As a biological information used in Biometrics authentication, known techniques such as a face, fingerprints, a retina, a iris, a vein pattern and voiceprint can be used. In this manner, the server 10 enables log in to the information processor 1 to run the game.

The server 10 is a so-called computer, repeatedly performs a process of receiving information based on a user's operation in the information processor 1 and returning a response corresponding to the information, and causes the game in the information processor 1 to proceed.

In more detail, the information processor 1 comprises a display 2 provided on the front surface of the cabinet 11 and a touch panel 5 provided on the entire surface of the display 2. The information processor 1 may be portable or desktop. Examples of the portable information processor 1 include a portable information device such as a portable computer or a laptop computer, a notebook computer, a tablet-type personal computer, a hand-held type personal computer, a PDA (Personal Data Assistant), and a smartphone.

The display 2 is configured to be able to display images. The display method of the display 2 is, for example, liquid crystal, organic electroluminescence, CRT (Cathode Ray Tube), and plasma. The touch panel 5 is configured to be able to detect the coordinates of the site where the user's finger and the like touch. The touch panel 5 employs the known technique such as the electromagnetic induction method and the electrostatic capacitance method. The information processor 1 determines the object on the screen touched by the user and the touch state such as a swipe based on the coordinates detected by the touch panel 5, and performs a response corresponding to the determination result.

In addition, in the following description, when the display 2 is viewed from the front, the lower end direction is referred to as "lower direction" or simply as "lower", the upper end direction is referred to as "upper direction" or simply as "upper", the left end direction is referred to as "left direction" or simply as "left", and the right end direction is referred to as "right direction" or simply as "right".

In addition, in the following description, such a description of a selection and a touch input of object by a user mean that the information processor 1 determines that a certain object has been selected by the user input received by a touch panel 5.

In addition, in the present embodiment, the touch panel 5 operates as an input device and receives an operation such as a swipe operation or a touch input, but is not limited thereto. For example, as an input device, it can be a microphone or a camera, and also can receive user's voice and gesture as an indicating operation.

As shown in FIG. 1, when a screen transition is performed in the information processor 1, the server 10 sequentially receives the identification information for identifying the transition destination screen from the information processor 1. Then, when starting a game based on the request from the information processor 1, the server 10 displays the screen identified by the identification information received at last from the information processor 1 as an initial screen of the game on the information processor 1.

For example, in the FIG. 1, in a display 2, after the initial screen is displayed, the screen is transitioned in an order of screen A, screen B, and screen C, and then the game is ended. The server 10 receives the identification information of the screen A when the screen A is displayed in the information processor 1, receives the identification information of the screen B when the screen B is displayed in the information processor 1, and receives the identification information of the screen C when the screen C is displayed in the information processor 1. That is, the server 10 updates the transition history data of the information processor 1 with the identification information of the latest screen received. Then, when the game is resumed in the information processor 1, the server 10 transmits the identification information of the newest screen to the information processor 1, and the screen at the time of previously ending can be displayed.

In the present embodiment, a plurality of kinds of slot games that are game elements can be played from a plurality of kinds of event screens. After playing a slot game by any one of the event screens, returning to the event screen. That is, the slot game screen that is the game element played from any one of the event screens is subordinate to the event screen. Such slot game screens as a plurality of game elements and event screens associated with these slot game screens are managed as a mode. That is, a mode corresponding to the event screen is started at the time point of transition to the event screen, and the mode is maintained even when transitioning into the screen which is associated with the event screen. That is, in the present embodiment, the information for identifying the mode and the information for identifying the screen are stored, but the present invention is not limited thereto.

In this manner, in a game where the screen is transitioned among a plurality of kinds of screens, the identification information for identifying the transitioned screen is stored when the screen is transitioned, and the screen indicated by the identification information stored is used as the initial screen when starting. Thus, the identification information of the screen displayed at last in the game is always stored, and the screen displayed at the end of the game is displayed when the game is started for the next time no matter at which screen the user ends the game. As a result, it is not necessary for the user to memorize the screen at the time of the last termination, and there is no need to transition from the screen after the activation to the screen at the time of the last termination, so that the user interface in the game can be improved.

Figure 2:
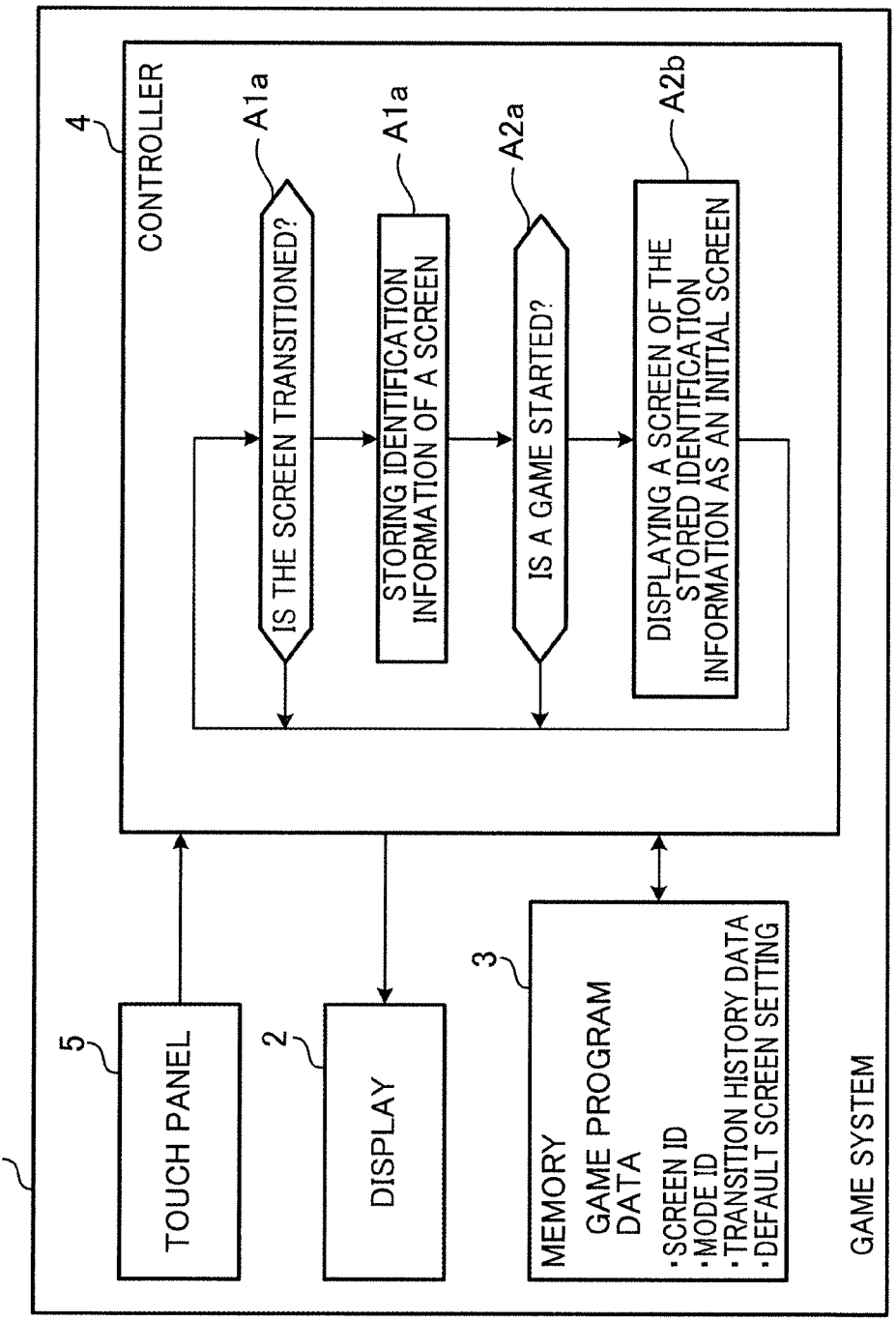
FIG. 2 is an illustrative view showing an schematic configuration of the present invention.

As shown in FIG. 2, a game system 100 has an information processor 1 and a server 10 as a computer, and has a display 2, a memory 3, a controller 4, and a touch panel 5.

The display 2 and the touch panel 5 are provided in the information processor 1, and function as an input unit and an output unit of the game system 100, respectively.

The memory 3 stores various programs including the game program to be executed by the controller 4 and various kinds of data for various programs. The memory 3 is a conceptual storage area of the game system 100, and it may be included by either the information processor 1 or the server 10. The function of the memory 3 may be distributed in the information processor 1 and the server 10, and alternatively, the function of the memory 3 may be provided to both of the information processor 1 and the server 10. That is, in the game program executed by the information processor 1, the information processor 1 requests the server 10 for data and the server 10 responds to the request for the data when the data to be stored in the server 10 is necessary.

The data and program in the memory 3 may be stored in advance at the stage of factory shipment, or may be downloaded from an unillustrated server or the like via communication means and stored. The communication means may be an interactive communication passage such as the Internet and a cable TV, or may be one-way broadcasting.

Alternatively, the data and program stored in the memory 3 may be stored in a recording medium such as a floppy disk, a CD-ROM, a DVD-ROM, an MO (optical magnetic disc), and a flash memory, and may be read from the recording medium and installed in the memory 3 according to need.

The controller 4 executes various processes in accordance with the game program stored in the memory 3. The controller 4 is a conceptual execution unit of the game system 100, and it may be included by either the information processor 1 or the server 10. The function of the controller 4 may be distributed in the information processor 1 and the server 10, and alternatively, the function of the controller 4 may be provided to both of the information processor 1 and the server 10.

In this manner, the game system 100 functions as a computer having the information processor 1 as the input unit (the touch panel 5) and the output unit (the display 2) and the information processor 1 and/or the server 10 as the memory 3 and the controller 4. In addition, there may be a plurality of the information processors 1 and/or the servers 10.

The memory 3 stores, for example, the following data. That is, the memory 3 stores the identification information (screen ID) for respectively identifying a plurality of kinds of screens that can be transitioned in the game. In addition, as described above, in the present embodiment, the memory 3 stores the identification information (mode ID) for identifying the mode associated with the screen in association with the screen ID. In addition, the memory 3 stores the transitioned screen ID at the time of the last transition of the one or more information processors 1 as the transition history data. In addition, when storing the transition history data of the plurality of information processors 1, the transition history data associated with the identification information (user ID) for identifying the user (login user) playing with the information processor 1 is stored. In addition, the memory 3 may also store settings of a default initial screen of the game specified by the user screen ID or the mode ID.

The controller 4 is programmed to perform the following processes. In other words, the game program stored in the memory 3 executes the following processes in the server 10, the information processor 1, or the game system 100 which is a computer. To be more specific, when the screen transition is performed in the information processor (A1*a*), the controller 4 executes a process of storing the identification information of the screen of the transition destination in the memory 3 (A1*b*), when starting a game according to the request from the information processor 1 (A2*a*), executes a process of displaying a screen identified by the identification information stored in the memory as an initial screen of the game of the information processor (A2*b*).

In this manner, in a game where the screen is transitioned among a plurality of kinds of screens, the identification information for identifying the transitioned screen is stored when the screen is transitioned, and the screen indicated by the identification information stored is used as the initial screen when starting. Thus, the identification information of the screen displayed at last in the game is always stored, and the screen displayed at the end of the game is displayed when the game is started for the next time no matter at which screen the user ends the game. As a result, it is not necessary for the user to memorize the screen at the time of the last termination, and there is no need to transition from the screen after the activation to the screen at the time of the last termination, so that the user interface in the game can be improved.

In addition, the game control method in which the processes of (A1) and (A2) are executed by the computer is realized by executing the processes of (A1) and (A2) by the computer (the server 10, the information processor 1 or the gaming system 100) having the above program. In other words, the server 10, the information processor 1, or the game system 100 has a plurality of processors that execute the processes of (A1) and (A2), respectively. In addition, in the following description, the server 10, the information processor 1, or the game system 100 will be described. However, these processes and actions can be replaced with the invention of the program or the game control method. In addition, the process executed by the controller 4 may be executed only by the information processor 1. That is, the memory 3 corresponds to a RAM 103 and the like of the information processor 1, and the information processor 1 stores only its own transition history data in the memory 3.

In addition, in the computer (the server 10, the information processor 1, or the game system 100), a plurality of kinds of screens include an event screen for executing an event, and the controller 4 may execute a process of acquiring temporarily stored data and sequentially storing the data in the memory 3 when an event is executed in the event screen, a process of acquiring a screen ID and the temporarily stored data at the start of the game, a process of determining whether or not the event is being executed at the end of the previous game based on the temporarily stored data, and a process of causing the information processor 1 to resume the event based on the temporarily stored data when it is determined that the event is being executed in the process of determining.

In this manner, in the game where the screen is transitioned among a plurality of kinds of screens, the temporarily stored data during the execution of the event in the event screen is also stored in the memory 3. Thus, when the previous end screen is the event screen at the time of resuming the game, not only the event screen is displayed as the initial screen but also the event is resumed based on the temporarily stored data in a case that the event is being executed when a previous event ends. As a result, a user can be helped when the user has to stop the event despite satisfying the event execution condition, and thus the user interface of the game can be improved.

In addition, in the computer (the server 10, the information processor 1, or the game system 100), the event is a slot game in which symbols for slot are variably displayed and stop-displayed in a symbol display area which is displayed in the information processor 1, and the controller 4 may store a game state of the slot game and a unit game information in one game as the temporarily stored data.

In this manner, the event is a slot game in which symbols for slot are variably displayed and stop-displayed, a game state of the slot game and a unit game information in one game is stored as the temporarily stored data, and the slot game is started again based on the information when the game is started again. Thus, even when the user ends the game halfway through the unit game of the slot game, the unit game can be resumed halfway again. As a result, the user can be helped even when the user has to stop the slot game even though the slot game has already started, and thereby it is able to improve the user interface of the game.

(Electric Configuration)

Figure 3:
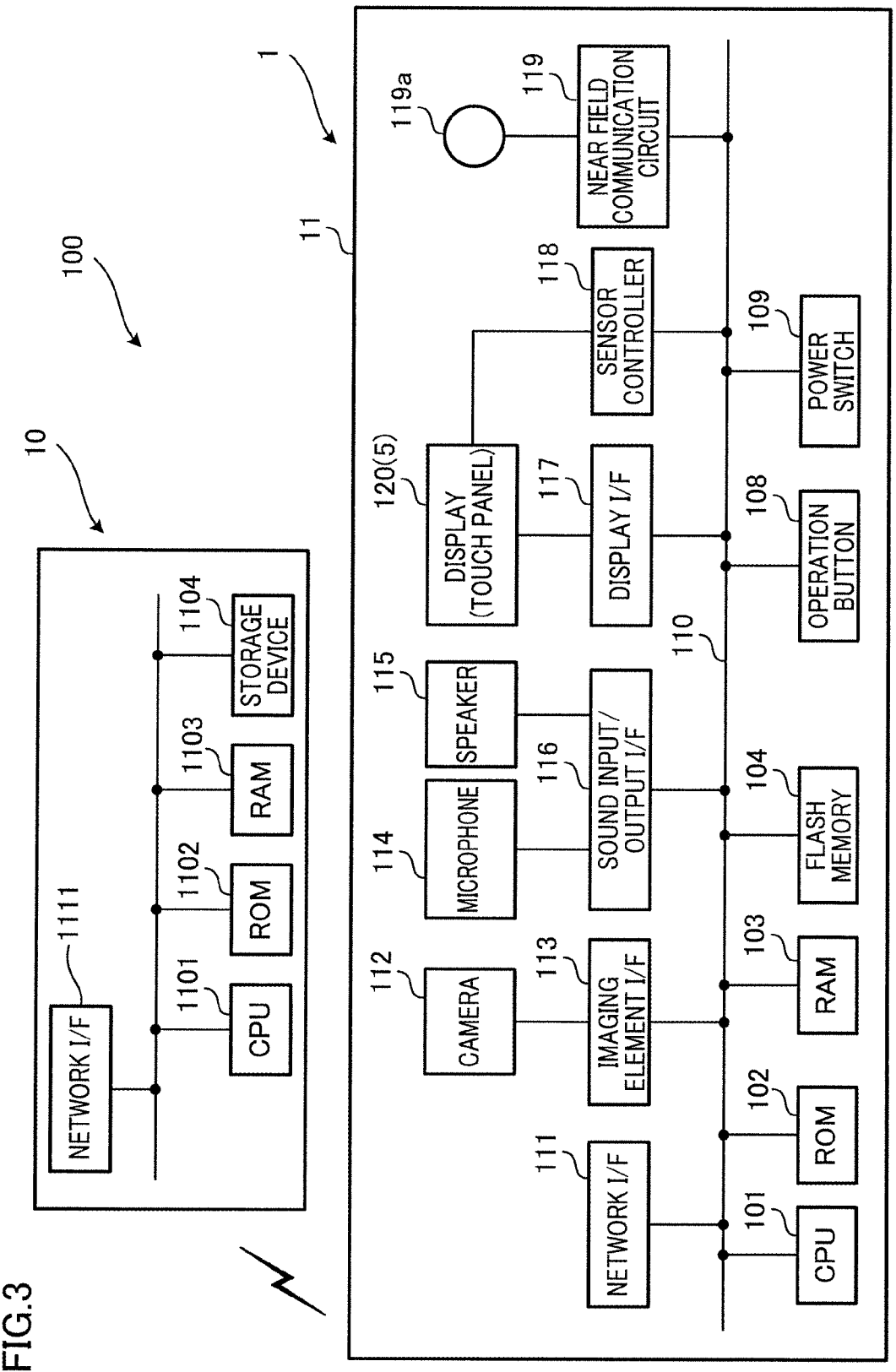
FIG. 3 is a block diagram showing an electric configuration of an information processor.

As shown in FIG. 3, the information processor 1 includes, in a housing 11, a CPU 101, a ROM 102, a RAM 103, a flash memory 104, an operation button 108, a power switch 109, a bus line 110, a network I/F 111, a camera 112, an imaging element I/F 113, a microphone 114, a speaker 115, a sound input/output I/F 116, a display I/F 117, a sensor controller 118, a near field communication circuit 119, and an antenna 119a of the near field communication circuit 119.

In addition, the server 10 is a so-called computer including a CPU 1101, a ROM 1102, a RAM 1103, a storage device 1104 such as a hard disk drive, and a network I/F 1111.

The CPU (Central Processing Unit) 101 and the CPU 1101 function as the main structure of the controller 4 and control the overall actions of the game system 100. The ROM (Read Only Memory) 102 and the ROM 1102 store programs for the driving of the CPU 101 and the CPU 1101 such as an IPL (Initial Program Loader).

The RAM (Random Access Memory) 103 and the RAM 1103 are used as work areas of the CPU 101 and the CPU 1101. The flash memory 104 stores various data such as a game program, a communication program, image data, and voice data. The operation button 108 is a button that is operated when the information processor 1 is initially set. The power switch 109 is a switch for switching ON/OFF of the power of the information processor 1.

The storage device 1104 functions as a database and stores game data for each of the plurality of information processors 1. The server 10 returns a response with reference to the database of the storage device 1104 as appropriate for the request from the game program of the information processor 1.

The network I/F (Interface) 111 and the network I/F 1111 are interfaces for performing data communication by utilizing a communication network such as the Internet. That is, the server 10 can perform data communication with one or more information processors 1 using the network I/F 1111 functioning as a communication device. In addition, the information processor 1 can perform data communication with the server 10 using the network I/F 1111 functioning as a communication device. The camera 112 is a built-in camera image capturing means which captures an image of an object to obtain image data under the control of the CPU 101. The imaging element I/F 113 is a circuit for controlling the camera 112. The microphone 114 is a built-in sound collection means to which sound is input. The sound input/output I/F 116 is a circuit for processing input and output of a sound signal between the microphones 114 and between the speakers 115 under the control of the CPU 101. The display I/F 117 is a circuit for sending image data to the display 2 under the control of the CPU 101. The display 2 is provided on the front surface of the housing 11. The sensor controller 118 is a circuit for receiving an input from the touch panel 5 of the display 2. The near field communication circuit 119 is a communication circuit based on NFC (Near Field Communication) (Registered Trademark). Bluetooth (Registered Trademark), or the like. The bus line 110 is an address bus, a data bus, or the like for electrically connecting the components such as the CPU 101.

In the present embodiment, the functions of the memory 3 and the controller 4 are distributed to the information processor 1 and the server 10 as described below. In the present embodiment, the server 10 stores, as the transition history data, a screen ID for respectively identifying a plurality of kinds of screens that the information processor 1 can transition in a game. When receiving an operation from the user and the user performs an operation for screen conversion, the information processor 1 transmits the screen ID of the screen of the transition destination to the server 10. When receiving the screen ID of the screen of the transition destination, the server 10 stores the screen ID received in association with the information processor 1 of the transmission source. In addition, the information processor 1 transmits, to the server 10, start information indicating that a game has been started when starting the game. When receiving the start information, the server 10 refers to the transition history data to acquire the screen ID associated with the information processor 1 of the transmission source, and returns the acquired screen ID to the information processor 1 of the transmission in response. The information processor 1 displays the screen indicated by the received screen ID as the initial screen at the start of the game. That is, "the server 10 displaying the screen identified by the screen ID as the initial screen of the game of the information processor 1" means that the server 10 transmits the screen ID for identifying the screen that is to be displayed as the initial screen at the time of start to the information processor 1.

In addition, the present invention is not limited thereto, and the functions of the memory 3 and the controller 4 may be realized only by the information processor 1, and for example, the following can be used. The information processor 1 stores, as the transition history data, a screen ID for respectively identifying a plurality of kinds of screens that the information processor 1 can transition in a game. When receiving an operation from the user and the user performs an operation for screen conversion, the information processor 1 stores, as the transition history data, the screen ID of the screen of the transition destination in the storage device thereof such as the RAM 103. The information processor 1 refers to the stored transition history data to acquire the screen ID at the start of the game, and displays the screen indicated by the screen ID as an initial screen at the start of the game.

(Display Screen)

Next, an example of a screen that is an object set as an initial screen at the time of start is specifically described. In the present embodiment, the screen associated with the three modes of the slot game that can be played as the game element in the game can be set as the object of the initial screen at the start of the game. Specifically, the game has three modes capable of playing a slot game in a map mode, a fixed event mode, and a time-defined event mode, and the screens associated with them are the objects of the initial screens.

(Display Screen: Map Mode)

Figure 4:
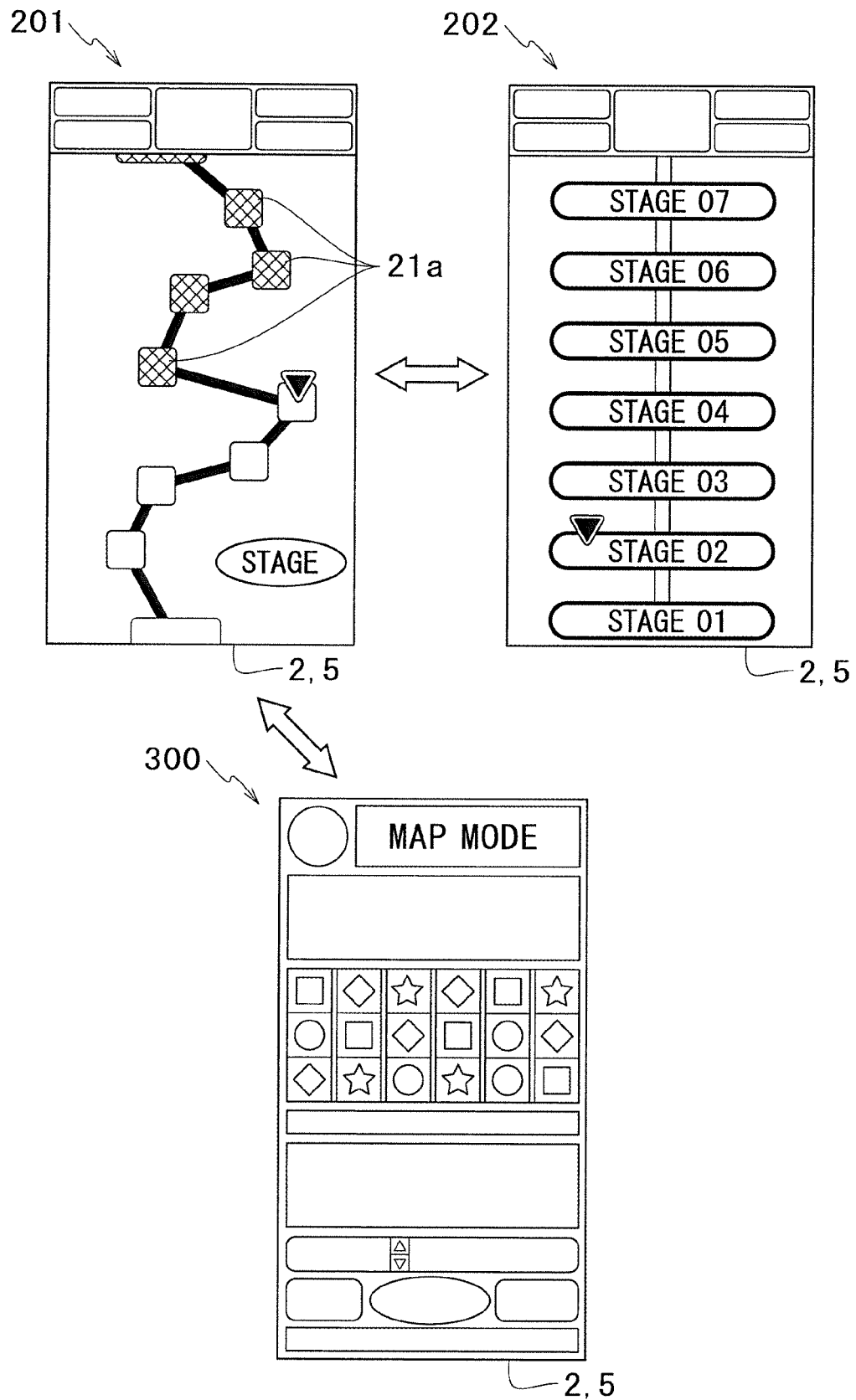
FIG. 4 is a diagram showing an example of a screen transition of the information processor.

As shown in FIG. 4, in the map mode, screens are transitioned between a map screen 201 and a stage selection screen 202 based on the touch operation of a user. In addition, when the map event generation icon 21*a* provided on the map screen 201 is touched, a slot game screen 300 corresponding to the map event generation icon 21*a* is transitioned to, and the slot game is able to be played. That is, the slot game screen 300 corresponds to the "event screen" of the present invention. The slot game screen 300 will be described later.

In addition, the stage selection screen 202 is not an initial screen object. That is, when the game is ended in the stage selection screen 202, the default screen of the map mode to which the stage selection screen 202 belongs is displayed as the initial screen without displaying the stage selection screen 202 as the initial screen. In the present embodiment, the default screen of the map mode is the map screen 201.

(Display Screen: a Fixed Event Mode)

As shown in FIG. 5, a menu area 23 is provided in the upper part in the map screen 201 etc. In the menu area 23, a map screen transition button 23*a* and an event screen transition button 23*b* are provided. The map screen transition button 23*a* is an optional object for transition to the map screen 201, and the event screen transition button 23*b* is an optional object for transition to the fixed event menu screen 211.

When the event screen transition button 23*b* of the menu area 23 in the map screen 201 or the like is touched, the screen is transitioned to the fixed event menu screen 211 to become the fixed event mode. When the fixed event generation icon 211*a* a plurality of which are provided on the fixed event menu screen 211 is touch-operated in the fixed event mode, the slot game screen 300 corresponding to the fixed event generation icon 211*a* is transitioned to, and the slot game is able to be played.

(Display Screen: Time-Defined Event Mode)

Figure 6:
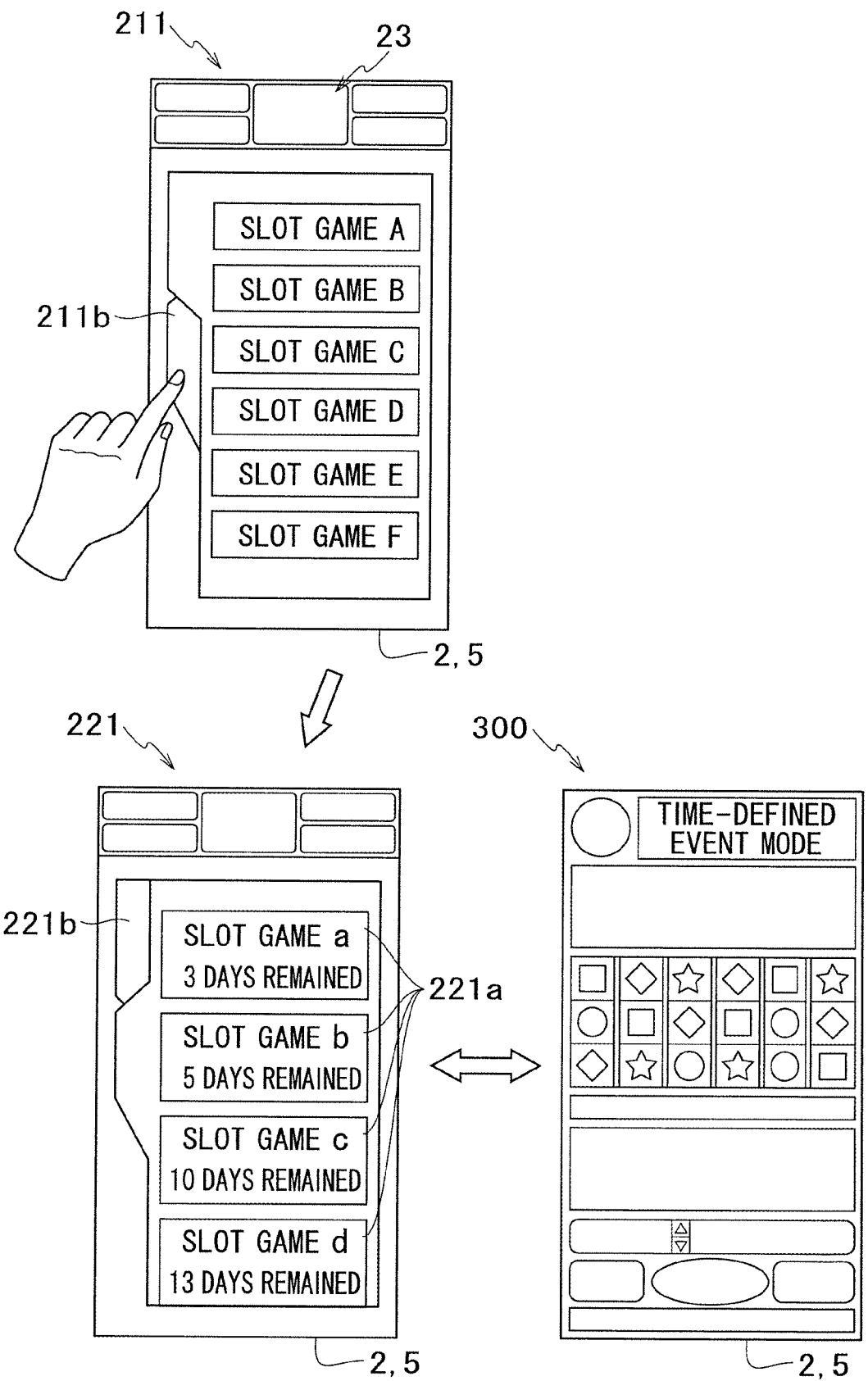
FIG. 6 is a diagram showing an example of a screen transition of the information processor.

As shown in FIG. 6, the fixed event menu screen 211 is provided with a time-defined event transition tab 211*b*. The time-defined event transition tab 211*b* is an optional object for transition to the time-defined event menu screen 221.

In the fixed event menu screen 211, when the time-defined event transition tab 211*b* is touched, the screen is transitioned to the time-defined event menu screen 221, becoming the time-defined event mode. When the time-defined event generation icon 221*a* a plurality of which are provided on the time-defined event menu screen 221 is touch-operated in the time-defined event mode, the slot game screen 300 corresponding to the time-defined event generation icon 221*a* is transitioned to, and the slot game is able to be played. In addition, the time-defined event menu screen 221 is provided with a fixed event transition tab 221*b*. The fixed event transition tab 221*b* is an optional object for transition to the fixed event menu screen 211.

(Display Screen: Slot Game Screen)

Figure 7:
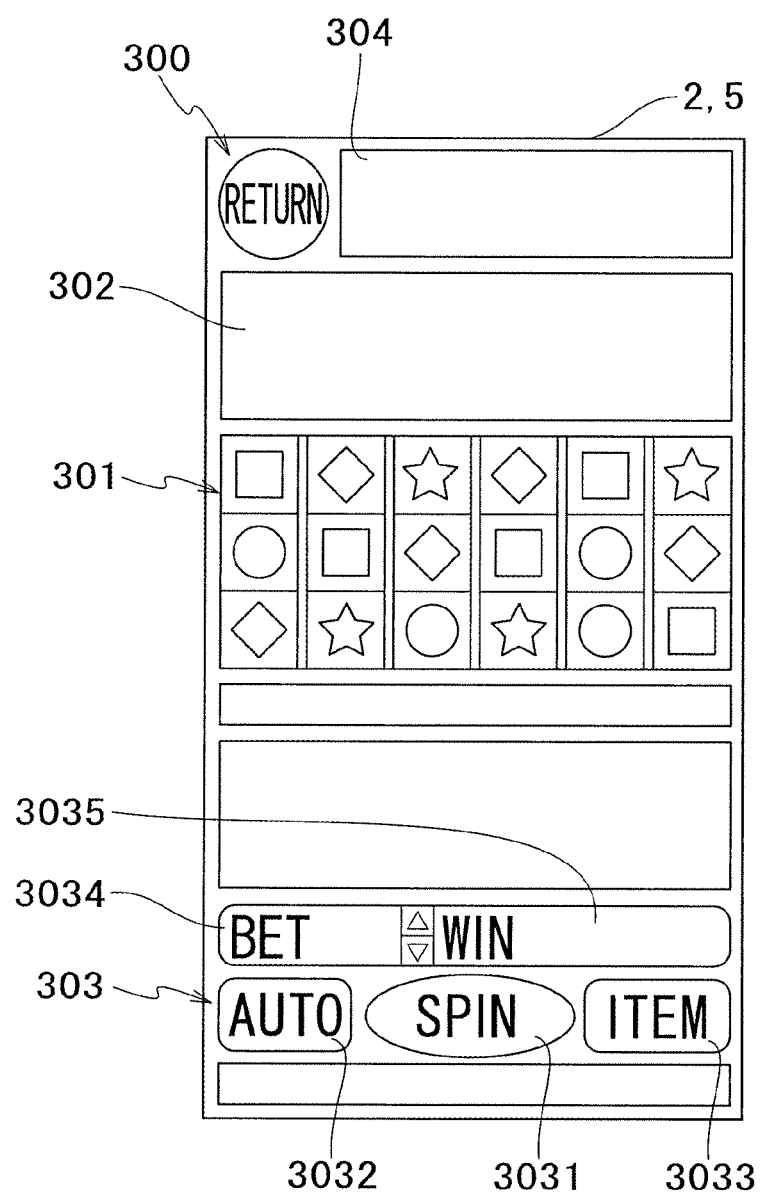
FIG. 7 is a diagram showing an example of a slot game screen.

As shown in FIG. 7, the slot game screen 300 transitioned in each event mode includes a game area 301 in which a plurality of symbol display areas are displayed in a configuration of a plurality of rows and a plurality of columns, an effect area 302 displaying a dynamic image or a still image such as a game character with matching to the slot game, an operation area 303 operated by the user for the progress of the game, and a game information display area 304 for displaying game contents and game information. To be more specific, for example, a current mode, identification information of the identified slot game in the mode, and the like are displayed in the game information display area 304. The operation area 303 has, as images, a spin button 3031, an AUTO button 3032, an ITEM button 3033, a BET button 3034, and a WIN display unit 3035.

As described above, the touch panel 5 that transmits the game screen is provided on the entire surface of the display 2. Thereby, for example, a slot game (unit game) can be executed once by touching the image of the spin button 3031. In addition, by pressing the image of the AUTO button 3032, the slot game can be continuously performed.

(Slot Game)

Here, the slot game will be described in detail.

(Slot Game: Definitions)

The "base game" in the slot game of the present embodiment is a game in which plural symbols are displayed (arranged) by being varied and stopped in the game area 301, and includes a normal game. A state in which a symbol is displayed after being varied and stopped in the game area 301 is termed "rearrangement". As a bonus game, the free game is executed at least once in the slot game. The slot game may include a process of executing a free game where symbols are rearranged on condition that the payout rate is higher than the payout rate in the normal game and a bonus payout is awarded in accordance with the rearranged symbols.

A "gaming value" which is awarded when a prize is established as a result of a game result is a coin, paper money, or electrically valuable information corresponding to these. Note that the gaming value in the present invention is not particularly limited. Examples of the gaming value include game media such as medals, tokens, cyber money, tickets, and the like. A ticket is not particularly limited, and a barcoded ticket may be adopted for example. Alternatively, the gaming value may be a game point not including valuable information.

The "free game" is a game which is executable with a smaller amount of gaming values bet than in the normal game. Note that "bet of smaller amounts of gaming values" encompasses a bet of zero gaming value. The "free game" therefore may be a game runnable without a bet of a gaming value, which free game awards an amount of gaming values based on symbols rearranged. In other words, the "free game" may be a game which starts without consumption of a gaming value. To the contrary, the "normal game" is a game runnable on condition that a gaming value is bet, which normal game awards an amount of gaming value based on the symbols rearranged. In other words, the "normal game" is a game which starts with consumption of a gaming value.

The "unit game" is a series of operations from the start of the receiving of a bet to a state in which an award can be established. To put it differently, the unit game includes a single bet time for receiving a bet, a single game time of rearranging stopped symbols, and a single payout time of a payout process of awarding a payout.

A state in which a symbol is displayed after being varied and stopped in the game area 301 is termed "rearrangement". To put it differently, the term "rearrangement" indicates that the symbols are rearranged after the arrangement of the symbols is dismissed. The term "arrangement" indicates a state in which the symbols are visually recognizable by an external player.

(Slot Game: Function Block)

Figure 8:
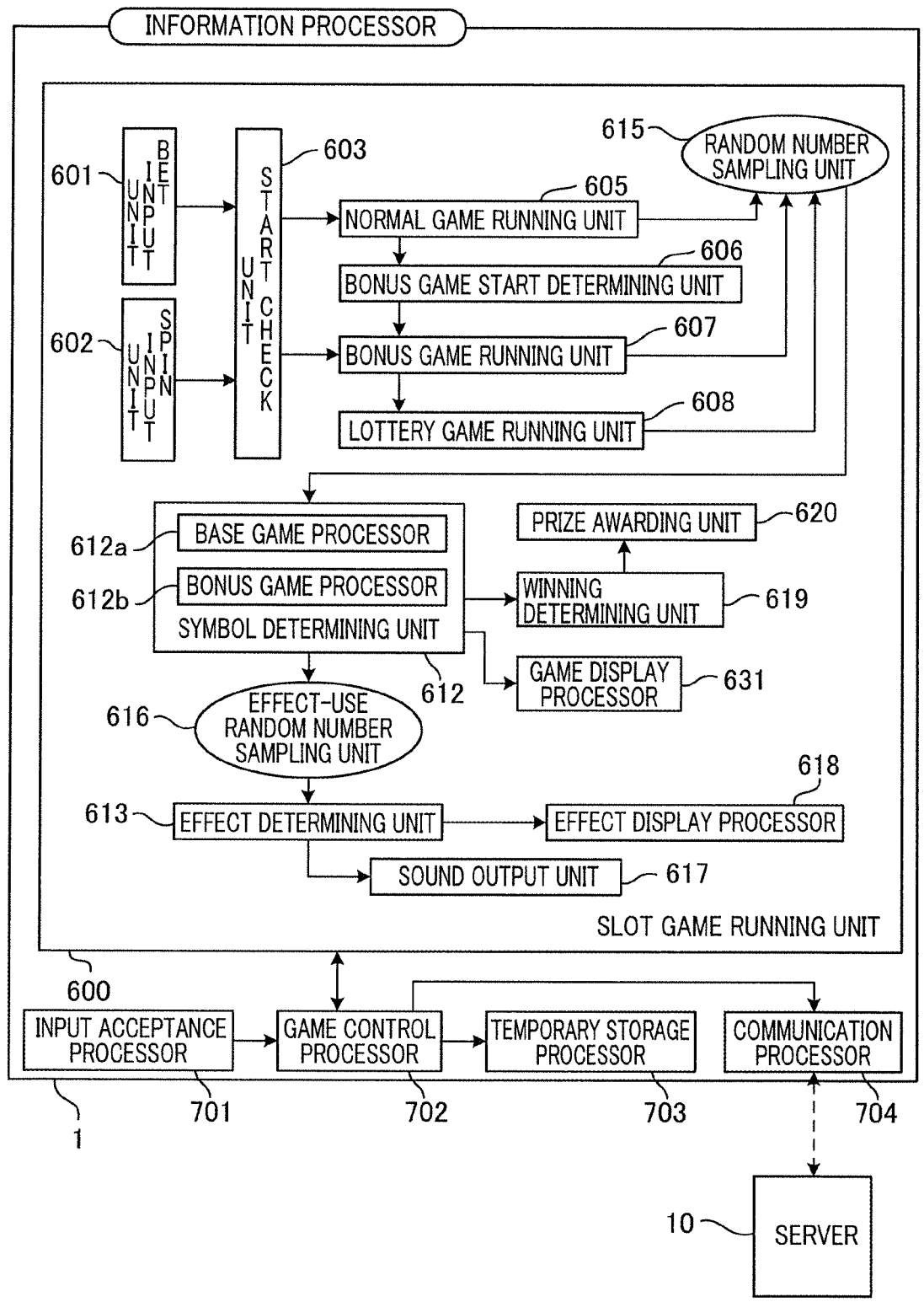
FIG. 8 is a functional block diagram of the information processor.

As shown in FIG. 8, the information processor 1 that is a slot machine which runs the slot game has the following functions for the slot game. Specifically, the information processor 1 includes an input acceptance processor 701, a game control processor 702, a temporary storage processor 703, a communication processor 704, and a slot game running unit 600.

The communication processor 704 is connected to the game control processor 702 and has a function of transmitting information from the game control processor 702 to the server 10 and a function of transmitting information from the server 10 to the game control processor 702. The input acceptance processor 701 has a function of accepting a request by a touch input or the like to the touch panel 5. The game control processor 702 has a function of controlling the entire game.

For example, when the information of the game played in the information processor 1 is required to register with the server 10, the game control processor 702 transmits the information to the communication processor 704 for the server 10, and when there is a communication from the server 10 indicating the completion of the register, the game is caused to proceed to the next step. To be more specific, the game control processor 702 has a function of, for example, sequentially transmitting the temporarily stored data of the slot game and the result of the slot game run by the slot game running unit 600 to the server 10, waiting for the response of the server 10 to cause the slot game to proceed to the next step. The temporary storage processor 703 has a function of controlling storage of the transition history data related to the screen transition in addition to temporarily storing data of the slot game and the result of the slot game described above. In addition, the game control processor 702 has a function of resuming a slot game which is interrupted on the basis of the temporarily stored data from the server 10.

The slot game running unit 600 of the information processor 1 includes a BET input unit 601 and a spin input unit 602. The BET input unit 601 and the spin input unit 602 are input devices. The BET input unit 601 has a function of receiving a bet in response to a user's operation. The spin input unit 602 has a function of receiving a user's operation, i.e., an instruction to start a game.

The slot game running unit 600 includes a start check unit 603, a normal game running unit 605, a bonus game start determining unit 606, a bonus game running unit 607, a random determination game running unit 608, a random number sampling unit 615, a symbol determining unit 612, an effect-use random number sampling unit 616, an effect determining unit 613, a sound output unit 617, an effect display processor 618, a winning determining unit 619, a prize awarding unit 620, and a game display processor 631.

The normal game running unit 605 has a function of running a normal game which is a base game, on condition that the BET input unit 601 is operated. The bonus game start determining unit 606 determines whether to run a bonus game, based on a combination of the symbols rearranged in the normal game. In other words, the bonus game start determining unit 606 has functions of: determining that the player is entitled to a bonus game when a bonus symbol is rearranged; and activating the bonus game running unit 607 so as to run a bonus game from the subsequent unit game. The lottery game running unit 608 has a function of lottery multiple bonuses including the bonus game, and the bonus game can be repeatedly executed after the execution of the bonus game running unit 607.

The symbol determining unit 612 includes a base game processor 612a and a bonus game processor 612b. The symbol determining unit 612 including these processors 612a and 612b has functions of: determining symbols to be rearranged based on a random number given from the random number sampling unit 615; rearranging the determined symbols in the game area 301 of the display 2; outputting rearrangement information of the symbols to the winning determining unit 619; and outputting an effect instruction signal to the effect-use random number sampling unit 616, based on the combination of the rearranged symbols.

The effect-use random number sampling unit 616 has a function of sampling an effect random number when receiving an effect instruction signal from the symbol determining unit 612 and a function of outputting the effect random number to the effect determining unit 613. The effect determining unit 613 has functions of: determining an effect content by using the effect-use random number; outputting image information on the determined effect content to the effect display processor 618; and outputting audio and illumination information of the determined effect content to the sound output unit 617.

The winning determining unit 619 has functions of: determining whether a winning is achieved based on a combination of symbols when information rearrangement information of the symbols is given; calculating an amount of payout based on a winning combination formed when it is determined that a winning has been achieved; and outputting, to the prize awarding unit 620, a payout signal which is based on the payout amount. The prize awarding unit 620 has a function of payout out a gaming value to the user. In addition, although not illustrated in detail, the output contents of the processors described above are appropriately transmitted to the server 10 connected via the communication processor 704.

The server 10 is not specifically illustrated and has a function of receiving and storing the temporarily stored data and the like from the information processor 1, a function of transmitting the temporarily stored data to the information processor 1 to resume the slot game, and a function of responding to a request from the information processor. As the function of responding to the request from the information processor, it is a process of permitting for the game to perform with respect to the respond described above.

(Slot Game: Game Contents)

The information processor 1 has three game modes as the slot game, namely the base game mode, the bonus game mode, and the random determination game mode. The base game mode is a game state in the normal game, and the bonus game mode corresponds to the game state in the free game. In the information processor 1, the unit game is executed with the base game mode as the main unit, and when a bonus trigger condition is satisfied in the base game mode, the information processor 1 shifts to the bonus game mode. The trigger of the bonus game is, for example, a condition in which three or more bonus symbols consecutively appear (are rearranged) from the first reel. The trigger of the bonus game may be another condition.

(Slot Game: Game Contents: Base Game Mode)

The base game mode is specifically described. In the game area 301 displayed on the display 2 shown in FIG. 7, symbols for the slot game are rearrangeable on the video reels with three rows and six columns. In a betting process, a bet amount is selected by the user. The bet amount is, for example, selected from numbers such as 1, 2, 3, 5, and 10 by operating the bet button 3034, and a desired number may be also input. The resource generated by accumulating parts of bet amounts is termed jackpot.

Next, in the game area 301, as the symbols are rearranged by varying (scroll-moving) and stopping (scroll-stop) the video reels, the presence or absence of winning is determined. Then, the win determination is performed based on the state of the rearranged symbols. For example, the bonus game trigger is established when the bonus symbols are consecutively rearranged from the first column area (first reel) to the six column area (sixth reel). The bonus game trigger is also established when the bonus symbols and a wild symbol which is able to substitute for the bonus symbol are consecutively rearranged.

(Slot Game: Game Contents: Bonus Game Mode)

The base game mode shifts to the bonus game mode when the trigger condition of the bonus game is established, and a free game process is executed.

In the free game process, free game reel strips used in the free game are determined, and a predetermined number of times of execution of the free game is set. The reel strips for the free game and the number of times of execution of the free game may be randomly chosen from plural selected options.

As the free game is run, win determination is executed. This win determination may be identical with the win determination in the base game. For example, when three or more bonus symbols consecutively appear from the first reel, the retrigger condition of the bonus game (free game) is established.

Then, it is determined whether a free game ends or not, and if the free game does not end, the free game continues, and the remaining free games are performed.

(Data Table)

The data table stored in the storage device 1104 of the server 10 will be described.

(Screen Identification Information Table)

As shown in FIG. 9, the screen identification information table includes a mode column, a mode ID column, a screen column, a screen ID column, an initial screen object column, and a default screen column. A mode to which the screen belongs is saved in the mode column. An identification number used to identify the mode inherently is saved in the mode ID column. A name for identifying a plurality of kinds of screens that the information processor 1 can transition is saved in the screen column. An identification number for inherently identifying a plurality of kinds of screens that the information processor 1 can transition is saved in the screen ID column.

A "TRUE" or "FALSE" indicating whether the screen of the corresponding screen column can be set as the initial screen or not is saved in the initial screen object column. That is, when the user has ended the game on the screen set to "FALSE", the screen does not become the initial screen. In the default screen column, when the user ends the game on the screen set to "FALSE", either "TRUE" or "FALSE" indicating whether or not the screen is displayed as the initial screen substituting for the screen (screen set to "FALSE") at the time of starting the next game is stored. That is, when the user ends the game on the screen set to "FALSE", the screen set to "TRUE" in the same mode is displayed at the start of the next game.

For example, when the game ends on the stage selection screen 202 in the map mode, since the initial screen object of the stage selection screen 202 is "FALSE", the map screen 201 set as the default screen in the same mode is set as the initial screen at the start of the next game. In addition, the screen identification information table may be also stored in each information processor 1.

(Transition History Data Table)

As shown in FIG. 10, the transition history data table has a user ID column, a screen ID column, a game state column, a remaining number of game play column, a bet amount column, an item column, a remaining number column, a slot state column, a random number column, an effect random number column. In the user ID column, the user ID of the user using the information processor 1 to play a game is saved. In the screen ID column, the screen ID of the transition destination which is transitioned by the user at last in the previous game is saved, and the screen ID is a screen ID saved in the screen ID column of the screen identification information table. That is, the screen ID at the end of the previous game is saved in the screen ID column. The server 10 determines the initial screen when the game is resumed based on the information of the screen ID column.

The game state of the slot game at the end of the game is saved in the game state column. For example, information indicating a normal game or a free game is saved in the game state column. In addition, in the game state column, saving when transitioning to the slot game screen 300. The remaining number of the free game of the bonus game is saved in the remaining number of game play column. That is, the remaining number of game play column is saved only when the game state is the bonus game. The bet amount that is the user selected at last is saved in the bet amount column. The information indicating the item used by the user is saved in the item column. The information indicating how many spins that the item used are valid is stored in the remaining number column. In this manner, the game state of the slot game is stored in the transition history data table.

The information indicating the state of the slot game to be displayed on the display 2 is saved in the slot state column. For example, the information indicating the state of the slot game is information indicating the stage before the bet is determined before spinning and information indicating the stage at which the bet is determined and a variable display of symbols is performed in the game area 301, and information indicating the stage at which a stop display is performed to symbols in the game area 301 (stage before the payout). In the random number column, the information indicating the random number extracted for determining the configuration specification of the symbols is saved. That is, based on this information, it is possible to determine the configuration specification of the symbols of the interrupted slot game. In the effect random number column, the information indicating the random number extracted for determining the effect is saved. That is, based on this information, it is possible to determine the effect of the interrupted slot game. In this manner, the unit game information in one game is stored in the transition history data table.

(Action of Server)

Next, a game program processed by the server executed by the CPU 1101 of the server 10 will be described with reference to FIG. 11.

Figure 11:
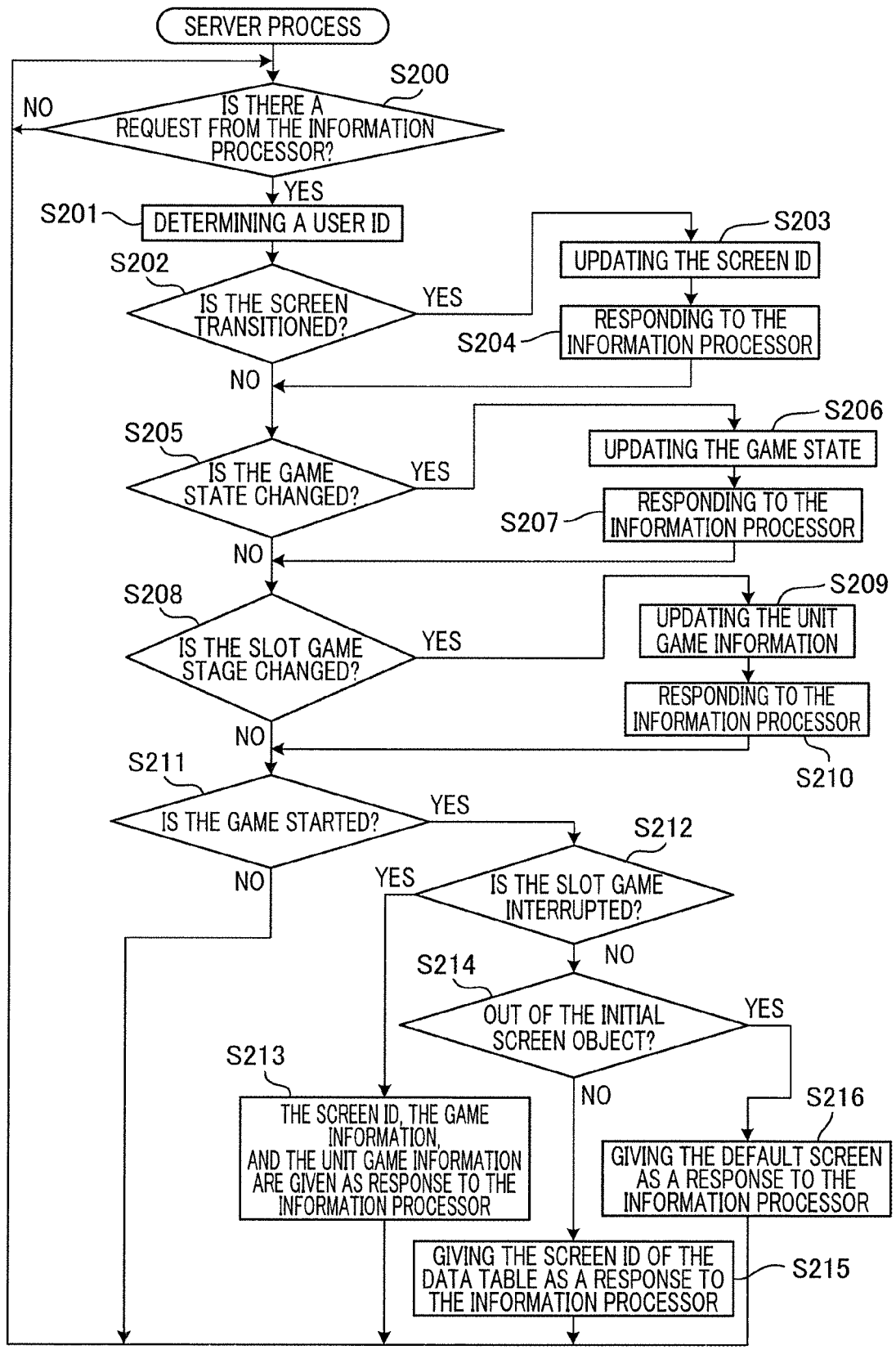
FIG. 11 is a flowchart of a server process.

As shown in FIG. 11, first, the CPU 1101 determines whether there is a request from the information processor 1 or not (S200). In the absence of a request from the information processor 1 (S200: NO), the CPU 1101 turns to step S200.

When there is a request from the information processor 1 (S200: YES), the CPU 1101 determines the user ID of the information processor 1 that has made the request (S201). After that, the CPU 1101 determines whether the request is a request indicating a screen transition (S202). When it is determined that the request is a request for indicating the screen transition (S202: YES), the screen ID of the user which is determined in the transition history data table is updated with the screen ID of the transitioned screen (S203). Then, in response to the information processor 1, the CPU 1101 causes the information processor 1 to display the transitioned screen (S204).

In step S202, when it is determined that the request is not a request indicating the screen transition (S202: NO) or after step S204, the CPU 1101 determines whether the request is a request for indicating a change of the game state (S205). That is, the CPU 1101 determines whether a bonus game wins in the slot game, the remaining number of times of execution of the free game in the bonus game has been increased or decreased, the bet amount is changed, or the item is used and so on, based on the information included in the request from the information processor 1. When it is determined that the request is a request indicating a change of the game state (S205: YES), the CPU 1101 updates the transition history data table to the content of the changed game state (S206). Then, in response to the information processor 1, the CPU 1101 causes the information processor 1 to permit the continuation of the playing of the slot game screen 300 and the transition to other screens (S204).

When it is determined in step S205 that the request is not a request indicating a change of the game state (S205: NO) or after step S207, the CPU 1101 determines whether to change to the slot game stage (S208). That is, the CPU 1101 determines the display state of the slot game (before spinning, during spinning, and after spinning (before the payout), and whether the random number for symbol determination and the random number for effect and the like have been decided, based on the information included in the request from the information processor 1. When it is determined that the request is a request indicating a change of the unit game information (S208: YES), the CPU 1101 updates the transition history data table to the content of the changed unit game information (S209). Then, in response to the information processor 1, the CPU 1101 causes the information processor 1 to permit the continuation of the unit game of the slot game screen 300, the start of the next unit game, and the transition to other screens (S210).

When it is determined in step S208 that the request is not a request indicating the change of the unit game information (S208: NO) or after step S210, the CPU 1101 determines whether the game is started (S211). When it is determined that the request is not a request indicating the start of the game (S211: NO), the CPU 1101 turns the process to S201.

On the other hand, when it is determined that the request is a request indicating the start of the game (S211: YES), the CPU 1101 determines whether the previous slot game is interrupted based on the transition history data table (S212). When it is determined that the previous slot game is interrupted (S212: YES), the CPU 1101 gives the screen ID, the game information, and the unit game information as a response to the information processor 1, so that the information processor 1 continues the interrupted slot game (S213). After that, the CPU 1101 turns the process to S200.

If it is determined in step S212 that the previous slot game is not interrupted (S212: NO), the CPU 1101 determines whether the screen ID saved in the transition history data table is out of the initial screen object or not (S214). When it is determined that it is not out of the initial screen object (S214: NO), the CPU 1101 gives the screen ID saved in the transition history data table as a response to the information processor 1, so that the information processor 1 displays the screen at the termination as the initial screen (S215). After that, the CPU 1101 turns the process to S200.

On the other hand, when it is determined that it is out of the initial screen object (S214: YES), the CPU 1101 refers to the screen identification information table and gives the default screen set in the mode to which the screen ID saved in the transition history data table belongs as a response to the information processor 1, so that the information processor 1 displays the screen of the same mode as the screen at the termination as the initial screen (S216). After that, the CPU 1101 turns the process to S200. In addition, when the default screen is not set in the same mode, the CPU 1101 may give the top screen as a response to the information processor 1, so that the information processor 1 displays the top screen as the initial screen.

(Action of Information Processor)

Figure 12:
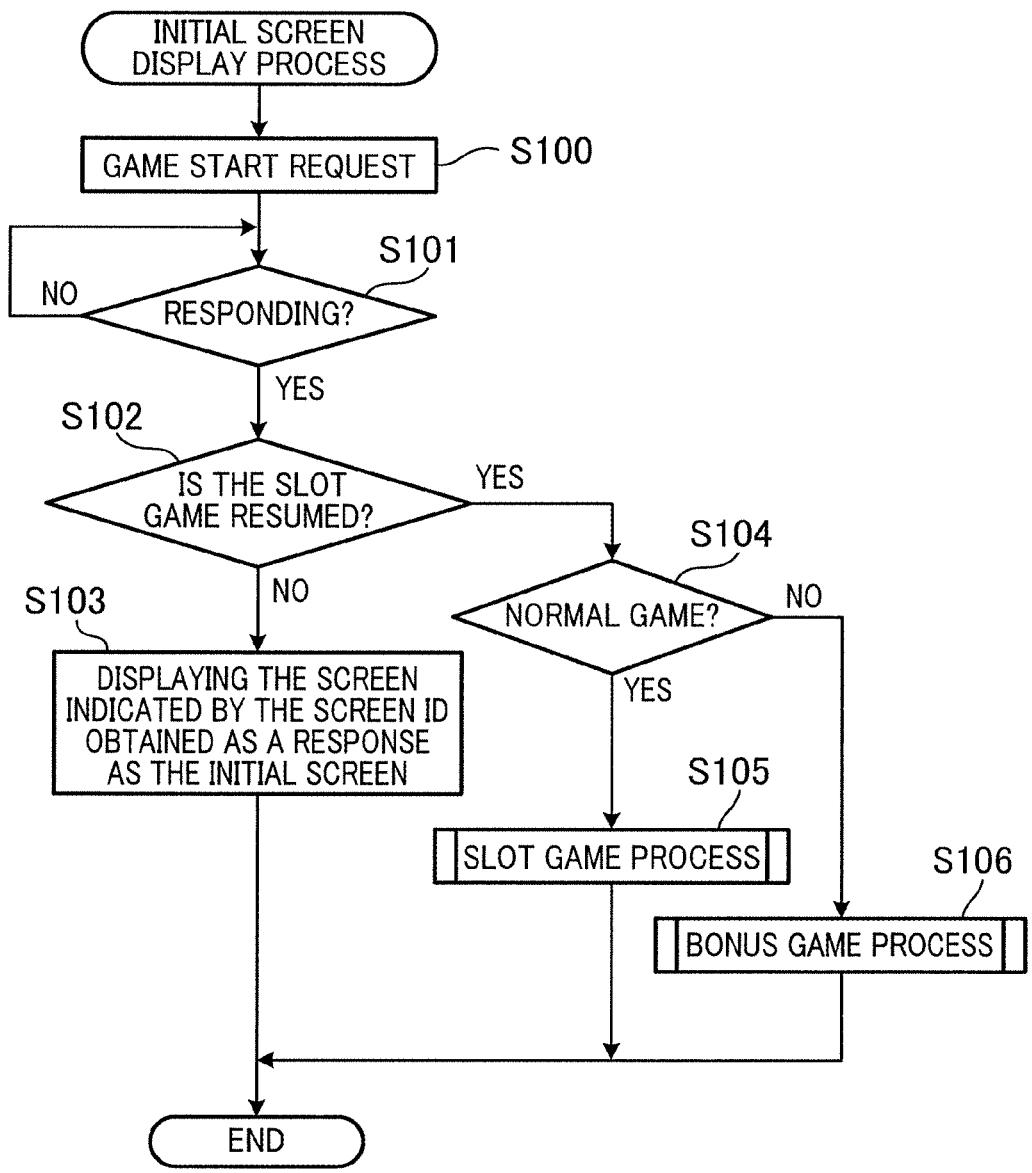
FIG. 12 is a flowchart of an initial screen display process.

Next, a game program of an initial screen display process executed by the CPU 101 of the information processor 1 will be described with reference to FIG. 12. The initial screen display process is a process executed when the game is started.

At first, the CPU 1101 transmits a game start request to the server 10 (S100). After that, it is determined whether there is a response from the server 10 or not (S101). When it is determined that there is no response (S101: NO), the CPU 101 turns the process to S101.

On the other hand, when it is determined that there is a response from the server 10 (S101: YES), it is determined whether the response is a response indicating the resuming of the slot game (S102). When it is determined that the response is not a response indicating the resuming of the slot game (S102: NO), the CPU 101 displays the screen indicated by the screen ID obtained as a response from the server 10 as the initial screen (S103), and ends this routine.

When it is determined that the response is a response indicating the resuming of the slot game (S102: YES), the CPU 101 determines whether the game state of the slot game to be resumed is a normal game or not (S104). When it is determined that the game state is the normal game (S104: YES), the CPU 101 executes a slot game process to be described later applying the game state obtained from the server 10 as a response (S105), and ends this routine. When it is determined that the game state is not the normal game but a bonus game (S104: NO), the CPU 101 executes a bonus game process to be described later applying the game state obtained from the server 10 as a response (S106), and ends this routine.

(Information Processor 1: Slot Game Process)

Next, a game program of a slot game process executed by the CPU 101 of the information processor 1 will be described with reference to FIG. 13.

Figure 13:
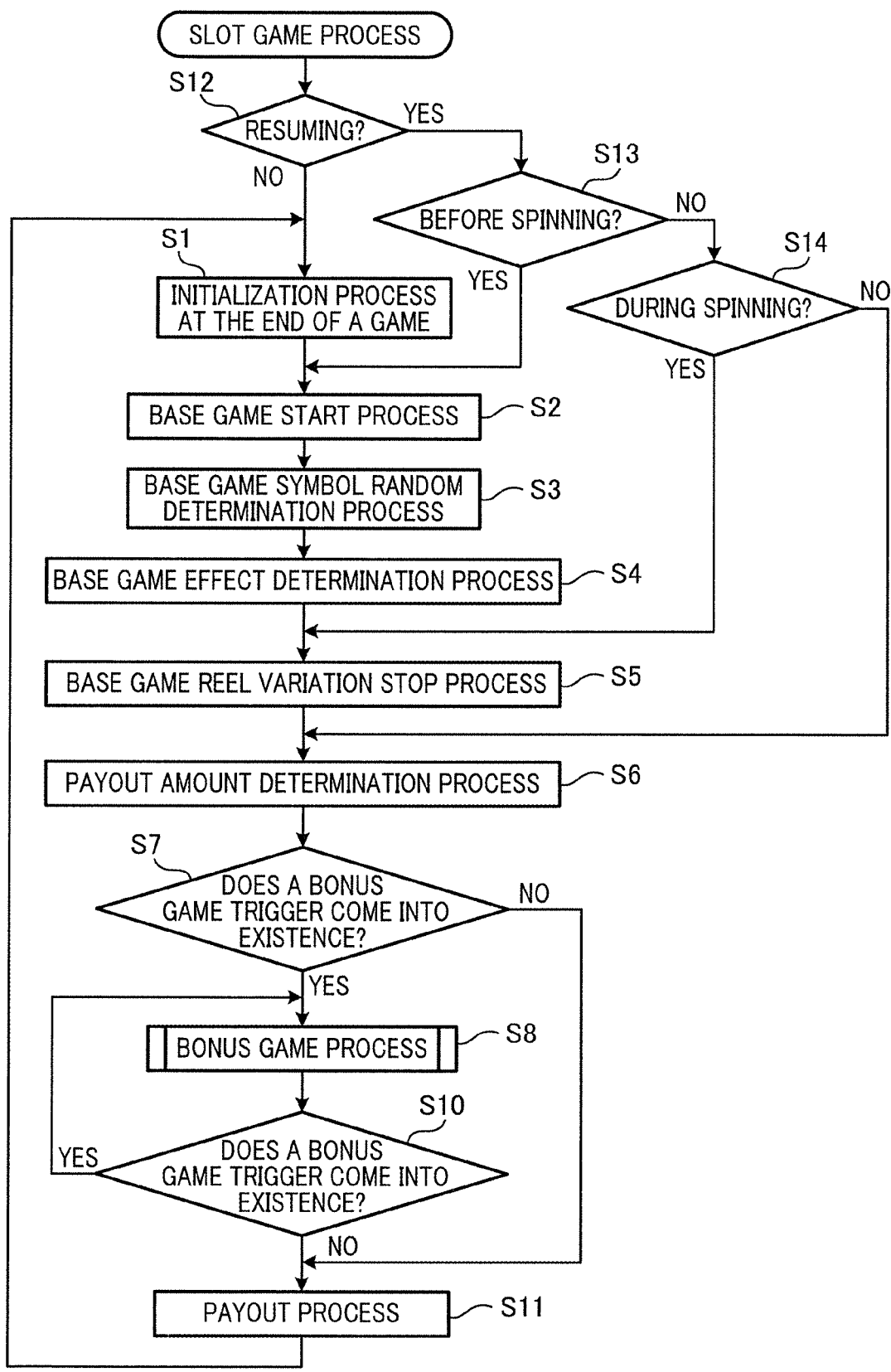
FIG. 13 is a flowchart of a slot game process.

As shown in FIG. 13, first, it is determined whether it is the resuming of the slot game or not (S12). When it is determined that it is not the resuming of the slot game (S12: NO), an initialization process at the end of a game is performed (S1). For example, this process clears data in a working area of the RAM 103, which becomes unnecessary at the end of each play of game, e.g., the bet amount and symbols selected by random determination. After a base game start process (S2), a base symbol random determination process is executed (S3). In this process, to-be-stopped symbols are randomly selected and determined based on a random number by using a random determination table.

Then a base game effect determination process is executed (S4). The CPU 101 samples an effect-use random number and randomly determines any of a plurality of predetermined effect contents, and executes the determined effect content at the determined timing. For example, an effect image is displayed in an effect area 302 of the display 2, and sound is output by the speaker 115.

Then a base game reel variation stop process is executed (S5). In this process, the scroll of the symbol columns in the game area 301 starts, and the to-be-stopped symbols determined in the base game symbol random determination process are stopped at predetermined positions.

Then a payout amount determination process is executed (S6). In the base game, a payout amount is determined in accordance with a combination of symbols and based on a payout table, and the determined payout amount is stored in a payout amount storage area of the RAM 103. When the bonus game trigger is established, a payout amount is determined in accordance with a combination of bonus symbols, based on a rule different from the rule in the base game.

Then whether the bonus game trigger has been established is determined (S7). When the bonus game trigger has been established (YES in S7), a bonus game process is executed (S8). When the bonus game trigger has been established (YES in S10), the bonus game process in S8 is executed again.

In the meanwhile, if the bonus game trigger has not been established in S7 or S10 (NO in S7 or S10), a payout process is executed (S11). The CPU 101 adds a value stored in the payout amount storage area to a value stored in a credit amount storage area (credit counter) provided in the RAM 103. Then the steps are executed again from S1.

In step S12, when it is determined that it is the resuming of the slot game (S12: YES), it is determined whether it is before spinning or not (S13). When it is determined that it is before spinning (S13: YES), the process is turned to step S2, and the subsequent process is executed based on the information obtained as a response from the server 10.

When it is determined in step S13 that it is not before spinning (S13: NO), it is determined whether it is during spinning or not (step S14). When it is determined that it is during spinning (S14: YES), the process is turned to step S5, and the subsequent process is executed based on the information obtained as a response from the server 10.

When it is determined in step S14 that it is not during spinning (S14: NO), the process is turned to step S6, and the subsequent process is executed based on the information obtained as a response from the server 10.

(Information Processor 1: Bonus Game Process)

Next, with reference to FIG. 14, a subroutine, i.e. a game program of the bonus game process, of the slot game process executed by the CPU 101 of the information processor 1 will be described.

Next, a game program of a slot game process executed by the CPU 101 of the information processor 1 will be described with reference to FIG. 14.

Figure 14:
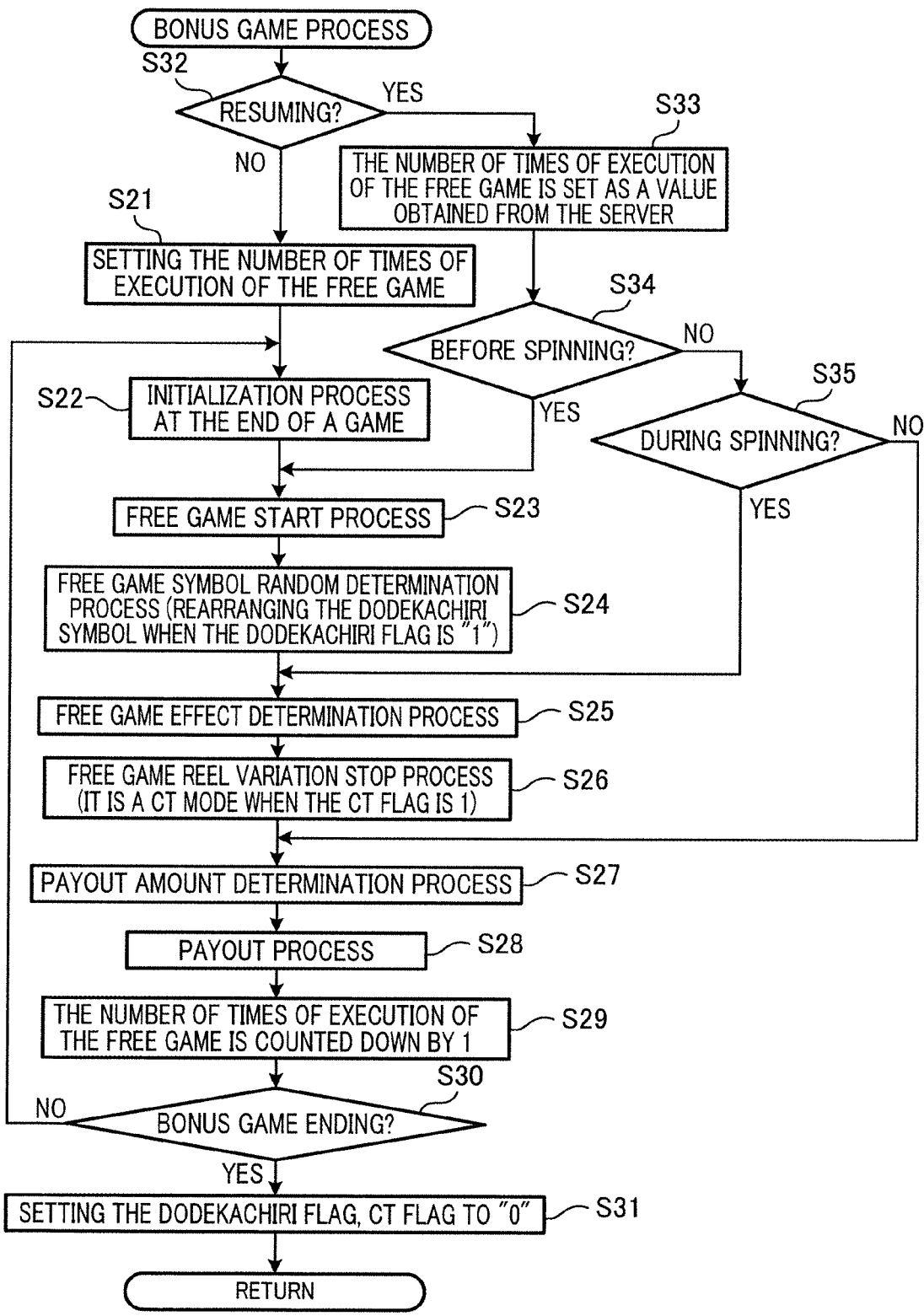
FIG. 14 is a flowchart of a bonus game process.

As shown in FIG. 14, first, it is determined whether it is the resuming of the slot game or not (S32). When it is determined that it is not the resuming of the slot game (S32: NO), the number of times of execution of the free game is set (S21). For example, the number of times of execution of the free game is set at 5. Then an initializing process at the end of each play of the game is executed (S22). For example, this process clears data in a working area of the RAM 103, which becomes unnecessary at the end of each play of game, e.g., the symbols selected by random determination. It is noted that the bet amount in the bonus game is identical with the bet amount in the base game immediately before the shift to the bonus game.

Thereafter, in the same manner as in the base game, a free game start process (S23), a symbol random determination process (S24), and a free game effect determination process (S25) are executed. In the free game, a free game symbol random determination table different from the symbol random determination table in the base game is used. In the free game symbol random determination process, when a Dodekachiri flag is set at 1, random determination is executed such that a Dodekachiri symbol is to be rearranged.

Thereafter, a free game reel variation stop process (S26) is executed to vary and stop the reels. In this process, the free game is shifted to a CT mode when a CT flag is set at 1. In this mode, the user is allowed to forcibly stop the reels by an operation. Thereafter, a payout amount determination process (S27) and a payout process (S28) are serially executed, and then the number of times of execution of the free game is counted down by 1 (S29). Then whether the bonus game has ended is determined (S30). When the number of times of execution of the free game is not 0 (NO in S30), the steps are executed again from S22 as it is determined that the bonus game has not ended. In the meanwhile, when the number of times of execution of the free game is 0 (YES in S30), it is determined that the bonus game has ended. Then the Dodekachiri flag and the CT flag are set at 0 (S31). As such, the flags are maintained at 0 in the bonus game after the base game, and the flags are changed from 1 to 0 in the bonus game after the random determination game. The process is then terminated and the processing routine shown in FIG. 13 is resumed.

When it is determined in step S32 that it is the resuming of the slot game (S32: YES), the number of times of execution of the free game obtained from the server 10 is set (S33). After that, it is determined whether it is before spinning or not (S34). When it is determined that it is before spinning (S34: YES), the process is turned to step S23, and the subsequent process is executed based on the information obtained as a response from the server 10.

When it is determined in step S34 that it is not before spinning (S34: NO), it is determined whether it is during spinning or not (S35). When it is determined that it is during spinning (S35: YES), the process is turned to step S25, and the subsequent process is executed based on the information obtained as a response from the server 10.

When it is determined in step S35 that it is not during spinning (S35: NO), the process is turned to step S27, and the subsequent process is executed based on the information obtained as a response from the server 10.

Although not shown in the drawings, in the case of determining the payout amount in the slot game process and the bonus game process, the CPU 101 executes a process of transmitting the payout amount to the server 10 as the obtained number.

SUMMARY OF THE INVENTION

The server 10 is a server 10 for causing a plurality of information processors 1 to run a game, which comprises a network I/F 1111 that enables data communication with the information processor 1, a memory 3 that stores identification information for respectively identifying a plurality of kinds of screens which can be transitioned by the information processor 1 in the game, and a controller 4 that is programmed to execute a process of storing the identification information of the transition destination screen in the memory 3 when a screen transition is performed in the information processor 1 and a process of displaying a screen identified by the identification information stored in the memory 3 as an initial screen of the game of the information processor 1 when starting a game according to a request from the information processor 1.

According to the configuration mentioned above, in a game where the screen is transitioned among a plurality of kinds of screens, the identification information for identifying the transitioned screen is stored in the server 10 when the screen is transitioned, and the screen indicated by the identification information stored in the server 10 is used as the initial screen when starting. Thus, the server 10 always stores the identification information of the screen displayed at last in the game, and the screen displayed at the end of the game is displayed when the game is started for the next time no matter at which screen the user ends the game. As a result, it is not necessary for the user to memorize the screen at the time of the last termination, and there is no need to transition from the screen after the activation to the screen at the time of the last termination, so that the user interface in the game can be improved.

In the server 10, a plurality of kinds of screens include the slot game screen 300 executing the slot game, and the controller 4 is programmed to execute a process of acquiring temporarily stored data (the game state and the unit game information) and sequentially storing the data in the memory 3 when the slot game is executed in such slot game screen 300, a process of acquiring a screen ID and the temporarily stored data at the start of the game, a process of determining whether or not the slot game is being executed at the termination of the previous slot game based on the temporarily stored data, and a process of causing the information processor 1 to resume the slot game based on the temporarily stored data when it is determined that the slot game is being executed in the process of determining.

According to the configuration mentioned above, in the game where the screen is transitioned among a plurality of kinds of screens, the temporarily stored data during the execution of the slot game in the slot game screen 300 is also stored in the server 10. Thus, when the previous end screen is the slot game screen 300 at the time of resuming the game, not only the slot game screen 300 is displayed as the initial screen but also the slot game is resumed based on the temporarily stored data in a case that the slot game is being executed at the time of the previous end. As a result, a user can be helped when the user has to stop the slot game even though the slot game execution condition is satisfied, and thus the user interface of the game can be improved.

In the server 10, the event is a slot game in which symbols for slot are variably displayed and stop-displayed in a game area 301 which is displayed in the information processor 1, and the controller 4 stores a game state of the slot game and a unit game information in one game as the temporarily stored data.

According to the configuration mentioned above, the event is a slot game in which symbols for slot are variably displayed and stop-displayed, a game state of the slot game and a unit game information in one game is stored as the temporarily stored data in the server 10, and the slot game is started again based on the information when the game is started again. Thus, even when the user ends the game halfway through the unit game of the slot game, the unit game can be resumed halfway again. As a result, the user can be helped even when the user has to stop the slot game even though the slot game has already started, and thereby it is able to improve the user interface of the game.

The game system is a game system having a plurality of information processors 1 and a server 10 causing the plurality of information processors 1 to run a game, and the server 10 comprises a network I/F 1111 that enables data communication with the information processor 1, a memory 3 that stores identification information for respectively identifying a plurality of kinds of screens which can be transitioned by the information processor 1 in the game, and a controller 4 that is programmed to execute a process of storing the identification information of the transition destination screen in the memory 3 when a screen transition is performed in the information processor 1 and a process of displaying a screen identified by the identification information stored in the memory 3 as an initial screen of the game of the information processor 1 when starting a game.

According to the configuration mentioned above, in a game where the screen is transitioned among a plurality of kinds of screens, the identification information for identifying the transitioned screen is stored in the server 10 when the screen is transitioned, and the screen indicated by the identification information stored in the server 10 is used as the initial screen when starting. Thus, the server 10 always stores the identification information of the screen displayed at last in the game, and the screen displayed at the end of the game is displayed when the game is started for the next time no matter at which screen the user ends the game. As a result, it is not necessary for the user to memorize the screen at the time of the last termination, and there is no need to transition from the screen after the activation to the screen at the time of the last termination, so that the user interface in the game can be improved.

The game program is a game program of the server 10 causing a plurality of information processors 1 to run a game, causing a computer having a network I/F 1111 that enables data communication with the information processor 1 and a memory 3 that stores identification information for respectively identifying a plurality of kinds of screens which can be transitioned by the information processor 1 in the game to execute a process of storing the identification information of the transition destination screen in the memory 3 when a screen transition is performed in the information processor 1 and a process of displaying a screen identified by the identification information stored in the memory 3 as an initial screen of the game of the information processor 1 when starting a game according to a request from the information processor 1.

According to the configuration mentioned above, in a game where the screen is transitioned among a plurality of kinds of screens, the identification information for identifying the transitioned screen is stored in the server 10 when the screen is transitioned, and the screen indicated by the identification information stored in the server 10 is used as the initial screen when starting. Thus, the server 10 always stores the identification information of the screen displayed at last in the game, and the screen displayed at the end of the game is displayed when the game is started for the next time no matter at which screen the user ends the game. As a result, it is not necessary for the user to memorize the screen at the time of the last termination, and there is no need to transition from the screen after the activation to the screen at the time of the last termination, so that the user interface in the game can be improved.

The game control method is a game control method which is executed by a computer, and the computer has a server 10 causing a plurality of information processor to run a game, a network I/F 1111 that enables data communication with the information processor 1, and a memory 3 that stores identification information for respectively identifying a plurality of kinds of screens which can be transitioned by the information processor 1 in the game, which executes a process of storing the identification information of the transition destination screen in the memory 3 when a screen transition is performed in the information processor 1 and a process of displaying a screen identified by the identification information stored in the memory 3 as an initial screen of the game of the information processor 1 when starting a game according to a request from the information processor 1.

According to the configuration mentioned above, in a game where the screen is transitioned among a plurality of kinds of screens, the identification information for identifying the transitioned screen is stored in the server 10 when the screen is transitioned, and the screen indicated by the identification information stored in the server 10 is used as the initial screen when starting. Thus, the server 10 always stores the identification information of the screen displayed at last in the game, and the screen displayed at the end of the game is displayed when the game is started for the next time no matter at which screen the user ends the game. As a result, it is not necessary for the user to memorize the screen at the time of the last termination, and there is no need to transition from the screen after the activation to the screen at the time of the last termination, so that the user interface in the game can be improved.

The information processors 1 includes a memory 3 that stores identification information for respectively identifying a plurality of kinds of screens which can be transitioned in the game and a controller 4 that is programmed to execute a process of storing the identification information of the transition destination screen in the memory 3 when a screen transition is performed and a process of displaying a screen identified by the identification information stored in the memory 3 as an initial screen of the game when starting a game.

According to the configuration mentioned above, in a game where the screen is transitioned among a plurality of kinds of screens, the identification information for identifying the transitioned screen is stored when the screen is transitioned, and the screen indicated by the identification information stored is used as the initial screen when starting. Thus, the information processor 1 always stores the identification information of the screen displayed at last in the game, and the screen displayed at the end of the game is displayed when the game is started for the next time no matter at which screen the user ends the game. As a result, it is not necessary for the user to memorize the screen at the time of the last termination, and there is no need to transition from the screen after the activation to the screen at the time of the last termination, so that the user interface in the game can be improved.

Embodiments of the present invention thus described above solely serve as specific examples of the present invention, and are not to limit the scope of the present invention. The specific structures and the like are suitably modifiable. Further, the effects described in the embodiments of the present invention described in the above embodiment are no more than examples of preferable effects brought about by the present invention, and the effects of the present invention are not limited to those described hereinabove.

In addition, in the above detailed description, for the sake of easier understanding of the present invention, a description has been given focusing on the characteristic part. The present invention is not limited to the embodiment described in the detailed description above, but may be applied to other embodiments, and the applicable range is various. In addition, terms and phraseology used in the present specification are used to clearly describe present invention and are not intended to limit the explanation of present invention. In addition, other configurations, systems, methods, and the like included in the concept of the present invention can be easily derived from the concept of the invention described in the present specification as long as it is a person skilled in the art. Therefore, the description of the claims must be regarded as including equivalent structures without departing from the range of the technical idea of the present invention. In addition, the abstract is intended to allow those skilled in the art, such as in the patent offices and general public offices, who know a little about the legal terms or the professional term and the like, to determine the technical content of the present application and the nature thereof rapidly though a simple search. Accordingly, the abstract is not intended to limit the scope of the invention as evaluated by the claims. In addition, in order to fully understand the purpose of the present invention and the specific effects of the present invention, it is desirable to make full reference and explanation of the already-disclosed document and the like.

The above detailed description includes a process performed by the computer. The above description and the present invention have been written for the purpose of enabling those skilled in the art to understand most effectively. In the present specification, each process used to derive a result should be understood as processes which are not self-contradictory. In addition, in each process, electric or electromagnetic signals are received, transmitted, recorded, or the like. In the processing of each process, such signal is expressed by bit, value, symbol, word, term, number, and the like, but it should be noted that it is used only for the convenience of illustration. In addition, in the processing of each process, there is a case which is described by a common expression with human actions, however, the processes described in this specification are executed in principle by various devices. In addition, the other structure required for performing each process can be clarified by the above description.

What is claimed is:

1. A server for causing an information processor to run a game, comprising:
    a communication unit enabling data communication with the information processor;
    a memory for storing identification information for respectively identifying a plurality of kinds of screens which are able to be transitioned by the information processor in the game; and
    a controller, the controller being programmed to execute:
        a process of storing the identification information of a screen transitioned by a screen transition in the memory when the screen transition is performed in the information processor; and
        a process of displaying the screen identified by the identification information, which is stored when a last screen transition is performed, among the identification information stored in the memory as an initial screen of the game of the information processor when the game is started again according to a request from the information processor,
    wherein the screen transitioned by the last screen transition includes an event screen for executing an event,
    wherein the process of storing the identification information of the screen includes a process of acquiring temporarily stored data at a time of execution of the event in the event screen and sequentially storing the data into the memory, and
    wherein the process of displaying the screen identified by the identification information includes:
        a process of acquiring the identification information and the temporarily stored data when the game is started again;
        a process of determining whether the event is being executed at the termination of a previous game or not, based on the temporarily stored data; and
        a process of causing the information processor to resume the event based on the temporarily stored data when it is determined that the event is being executed in the process of determining,
    wherein, the event is a slot game in which symbols for slot are variably displayed and stop-displayed in a symbol display area displayed in the information processor,
    wherein the process of acquiring temporarily stored data includes a process of storing a game state of the slot game and unit game information in one game as the temporarily stored data,
    wherein when the unit game information indicates the termination of the previous game before the symbols are variably displayed, the process of causing the information processor to resume the event includes a process of causing the information processor to resume the event by variably displaying the symbols, and
    wherein when the unit game information indicates the termination of the previous game while the symbols are variably displayed, the process of causing the information processor to resume the event includes a process of causing the information processor to resume the event by stopping variably displaying the symbols.

2. A game system having an information processor and a server for causing the information processor to run a game, wherein the server includes:
    a communication unit enabling data communication with the information processor;
    a memory for storing identification information for respectively identifying a plurality of kinds of screens which are able to be transitioned by the information processor in the game; and
    a controller, the controller is programmed to execute:
        a process of storing the identification information of a screen transitioned by a screen transition in the memory when the screen transition is performed in the information processor; and
        a process of displaying the screen identified by the identification information, which is stored when a last screen transition is performed, among the identification information stored in the memory as an initial screen of the game of the information processor when the game is started again,
    wherein the screen transitioned by the last screen transition includes an event screen for executing an event,
    wherein the process of storing the identification information of the screen includes a process of acquiring temporarily stored data at a time of execution of the event in the event screen and sequentially storing the data into the memory, and
    wherein the process of displaying the screen identified by the identification information includes:
        a process of acquiring the identification information and the temporarily stored data when the game is started again;
        a process of determining whether the event is being executed at the termination of a previous game or not, based on the temporarily stored data; and
        a process of causing the information processor to resume the event based on the temporarily stored data when it is determined that the event is being executed in the process of determining,
    wherein the event is a slot game in which symbols for slot are variably displayed and stop-displayed in a symbol display area displayed in the information processor,
    wherein the process of acquiring temporarily stored data includes a process of storing a game state of the slot game and unit game information in one game as the temporarily stored data,
    wherein when the unit game information indicates the termination of the previous game before the symbols are variably displayed, the process of causing the information processor to resume the event includes a process of causing the information processor to resume the event by variably displaying the symbols, and
    wherein when the unit game information indicates the termination of the previous game while the symbols are variably displayed, the process of causing the information processor to resume the event includes a process of causing the information processor to resume the event by stopping variably displaying the symbols.

3. A non-transitory computer-readable medium storing a game program of a server for causing an information processor to run a game,
    the game program causing a computer having a communication unit enabling data communication with the information processor and a memory for storing identification information for respectively identifying a plurality of kinds of screens which are able to be transitioned by the information processor in the game to execute:
  a process of storing the identification information of a screen transitioned by a screen transition in the memory when the screen transition is performed in the information processor; and
  a process of displaying the screen identified by the identification information, which is stored when a last screen transition is performed, among the identification information stored in the memory as an initial screen of the game of the information processor when the game is started again according to a request from the information processor,
  wherein the screen transitioned by the last screen transition includes an event screen for executing an event,
  wherein the process of storing the identification information of the screen includes a process of acquiring temporarily stored data at a time of execution of the event in the event screen and sequentially storing the data into the memory, and
  wherein the process of displaying the screen identified by the identification information includes:
    a process of acquiring the identification information and the temporarily stored data when the game is started again;
    a process of determining whether the event is being executed at the termination of a previous game or not, based on the temporarily stored data; and
    a process of causing the information processor to resume the event based on the temporarily stored data when it is determined that the event is being executed in the process of determining,
  wherein the event is a slot game in which symbols for slot are variably displayed and stop-displayed in a symbol display area displayed in the information processor,
  wherein the process of acquiring temporarily stored data includes a process of storing a game state of the slot game and unit game information in one game as the temporarily stored data,
  wherein when the unit game information indicates the termination of the previous game before the symbols are variably displayed, the process of causing the information processor to resume the event includes a process of causing the information processor to resume the event by variably displaying the symbols, and
  wherein when the unit game information indicates the termination of the previous game while the symbols are variably displayed, the process of causing the information processor to resume the event includes a process of causing the information processor to resume the event by stopping variably displaying the symbols.

4. A game control method run by a computer which has a server causing an information processor to run a game, a communication unit enabling data communication with the information processor, and a memory for storing identification information for respectively identifying a plurality of kinds of screens which are able to be transitioned by the information processor in the game, the game control method comprising:
  storing the identification information of a screen transitioned by a screen transition in the memory when the screen transition is performed in the information processor; and
  displaying the screen identified by the identification information, which is stored when a last screen transition is performed, among the identification information stored in the memory as an initial screen of the game of the information processor when the game is started again according to a request from the information processor,
  wherein the screen transitioned by the last screen transition includes an event screen for executing an event,
  wherein storing the identification information of the screen transitioned by the last screen transition includes acquiring temporarily stored data at a time of execution of the event in the event screen and sequentially storing the data into the memory,
  wherein displaying the screen identified by the identification information includes:
    acquiring the identification information and the temporarily stored data when the game is started again;
    determining whether the event is being executed at the termination of a previous game or not, based on the temporarily stored data; and
    causing the information processor to resume the event based on the temporarily stored data when it is determined that the event is being executed in the process of determining,
  wherein the event is a slot game in which symbols for slot are variably displayed and stop-displayed in a symbol display area displayed in the information processor,
  wherein acquiring temporarily stored data includes storing a game state of the slot game and unit game information in one game as the temporarily stored data,
  wherein when the unit game information indicates the termination of the previous game before the symbols are variably displayed, causing the information processor to resume the event includes causing the information processor to resume the event by variably displaying the symbols, and
  wherein when the unit game information indicates the termination of the previous game while the symbols are variably displayed, causing the information processor to resume the event includes causing the information processor to resume the event by stopping variably displaying the symbols.

5. An information processor comprising:
  a memory for storing identification information for respectively identifying a plurality of kinds of screens which are able to be transitioned in a game; and
  a controller, the controller executing:
    a process of storing the identification information of a screen transitioned by a screen transition in the memory when the screen transition is performed; and
    a process of displaying the screen identified by the identification information, which is stored when a last screen transition is performed, among the identification information stored in the memory as an initial screen of the game when the game is started again,
  wherein the screen transitioned by the last screen transition includes an event screen for executing an event,
  wherein the process of storing the identification information of the screen includes a process of acquiring temporarily stored data at a time of execution of the event in the event screen and sequentially storing the data into the memory, and
  wherein the process of displaying the screen identified by the identification information includes:
    a process of acquiring the identification information and the temporarily stored data when the game is started again;

a process of determining whether the event is being executed at the termination of a previous game or not, based on the temporarily stored data; and a process of resuming the event based on the temporarily stored data when it is determined that the event is being executed in the process of determining, wherein the event is a slot game in which symbols for slot are variably displayed and stop-displayed in a symbol display area displayed in the information processor, wherein the process of acquiring temporarily stored data includes a process of storing a game state of the slot game and unit game information in one game as the temporarily stored data, wherein when the unit game information indicates the termination of the previous game before the symbols are variably displayed, the process of resuming the event includes a process of resuming the event by variably displaying the symbols, and wherein when the unit game information indicates the termination of the previous game while the symbols are variably displayed, the process of resuming the event includes a process of resuming the event by stopping variably displaying the symbols.

6. A server for causing a plurality of information processors to run a game, comprising:

a communication unit enabling data communication with the information processors;

a memory for storing identification information for respectively identifying a plurality of kinds of screens which are able to be transitioned by the information processors in the game in association with a plurality of user IDs which correspond to the information processors, respectively; and a controller, the controller being programmed to execute:

a process of, when a screen transition is performed in each of the information processors, storing, in the memory, the identification information of a screen transitioned by the screen transition in association with a user ID of an information processor in which the screen transition is performed;

a process of, when a game is terminated and then is started again according to a request from one of the information processors, displaying the screen identified by the identification information, which is associated with the user ID received from the one of the information processors among the identification information stored in the memory, as an initial screen of the game of the one of the information processors, wherein the screen transitioned by the screen transition when the game is terminated includes an event screen for executing an event, wherein the process of storing the identification information of the screen includes a process of acquiring temporarily stored data at a time of execution of the event in the event screen and sequentially storing the data into the memory, and wherein the process of displaying the screen identified by the identification information includes:

a process of acquiring the identification information and the temporarily stored data when the game is started again;

a process of determining whether the event is being executed at the termination of a previous game or not, based on the temporarily stored data; and a process of causing the information processor to resume the event based on the temporarily stored data when it is determined that the event is being executed in the process of determining, wherein, the event is a slot game in which symbols for slot are variably displayed and stop-displayed in a symbol display area displayed in the information processor, wherein the process of acquiring temporarily stored data includes a process of storing a game state of the slot game and unit game information in one game as the temporarily stored data, wherein when the unit game information indicates the termination of the previous game before the symbols are variably displayed, the process of causing the information processor to resume the event includes a process of causing the information processor to resume the event by variably displaying the symbols, and wherein when the unit game information indicates the termination of the previous game while the symbols are variably displayed, the process of causing the information processor to resume the event includes a process of causing the information processor to resume the event by stopping variably displaying the symbols.

* * * * *